US010360734B2

(12) United States Patent
Drouin et al.

(10) Patent No.: US 10,360,734 B2
(45) Date of Patent: Jul. 23, 2019

(54) CONTEXTUAL APPLICATIONS IN A MIXED REALITY ENVIRONMENT

(71) Applicant: Unity IPR ApS, Copenhagen K (DK)

(72) Inventors: Sylvio Herve Drouin, San Francisco, CA (US); Gregory Lionel Xavier Jean Palmaro, San Francisco, CA (US); Dioselin Alejandra Gonzalez Rosillo, San Francisco, CA (US)

(73) Assignee: Unity IPR ApS, Copenhagen K (DK)

( * ) Notice: Subject to any disclaimer, the term of this patent is extended or adjusted under 35 U.S.C. 154(b) by 0 days.

(21) Appl. No.: 15/972,020

(22) Filed: May 4, 2018

(65) Prior Publication Data

US 2018/0322706 A1    Nov. 8, 2018

Related U.S. Application Data

(60) Provisional application No. 62/502,349, filed on May 5, 2017, provisional application No. 62/561,017, filed on Sep. 20, 2017.

(51) Int. Cl.
*G06T 19/00* (2011.01)
*G06K 9/00* (2006.01)
(Continued)

(52) U.S. Cl.
CPC ........ *G06T 19/006* (2013.01); *G02B 27/0172* (2013.01); *G06F 3/0484* (2013.01);
(Continued)

(58) Field of Classification Search
None
See application file for complete search history.

(56) References Cited

U.S. PATENT DOCUMENTS 9,536,355 B1   1/2017 Kumar et al.
2012/0212414 A1   8/2012 Osterhout et al.
(Continued)

FOREIGN PATENT DOCUMENTS

WO    WO-2018204879 A1    11/2018

OTHER PUBLICATIONS

"International Application Serial No. PCT/US2018/031245, International Search Report dated Jul. 19, 2018", 2 pgs.
(Continued)

*Primary Examiner* — Robert J Craddock
(74) *Attorney, Agent, or Firm* — Schwegman Lundberg & Woessner, P.A.

(57) ABSTRACT

A method of implementing a plurality of contextual applications within a mixed reality (MR) environment on an MR-capable device of a user is disclosed. At least one real-world object is identified in the MR environment by applying an object recognition algorithm to one or more attributes of the at least one real-world object that are captured by sensors of the MR-capable device. A first contextual application of the plurality of contextual applications is used to determine an association between a first set of contextual triggers and a second contextual application of the plurality of contextual applications. A second contextual application is initiated based on a satisfying of the at least one contextual trigger. A function is invoked within the second contextual application based on an interaction of the user with at least one virtual object satisfying a second set of contextual triggers associated with the second contextual application.

20 Claims, 16 Drawing Sheets

(51) Int. Cl.
*G02B 27/01* (2006.01)
*G06F 3/0484* (2013.01)

(52) U.S. Cl.
CPC .. G06K 9/00201 (2013.01); *G02B 2027/0138* (2013.01); *G02B 2027/0178* (2013.01)

(56) References Cited

U.S. PATENT DOCUMENTS

2013/0044128 A1* 2/2013 Liu .......................... G09G 5/00
345/633
2014/0267405 A1* 9/2014 Mullins ................. G06T 19/006
345/633

OTHER PUBLICATIONS

"International Application Serial No. PCT/US2018/031245, Written Opinion dated Jul. 19, 2018", 5 pgs.

\* cited by examiner

CONTEXTUAL APPLICATIONS IN A MIXED REALITY ENVIRONMENT

CROSS REFERENCE TO RELATED APPLICATIONS

This application claims the benefit of U.S. Provisional Application No. 62/502,349, filed May 5, 2017, and U.S. Provisional Application No. 62/561,017, filed Sep. 20, 2017, each of which is incorporated by reference herein in its entirety.

TECHNICAL FIELD

The subject matter disclosed herein generally relates to the technical field of computer systems and, more specifically, to computer systems and methods for facilitating contextual applications in virtual or mixed reality environments.

BACKGROUND

The technology in and around virtual reality (VR) and augmented reality (AR) is growing and maturing quickly. VR and AR are experienced primarily by wearing a head mounted display (HMD), and optionally hand tracking and input devices. With AR, for example, the HMD may be configured to integrate virtual objects in conjunction with a real-world environment surrounding the wearer. Some known AR systems also include software tools for providing information about the environment to the wearer via the HMD.

BRIEF DESCRIPTION OF THE DRAWINGS

Various ones of the appended drawings merely illustrate example embodiments of the present disclosure and cannot be considered as limiting its scope, and in which.

The headings provided herein are merely for convenience and do not necessarily affect the scope or meaning of the terms used. Like numbers in the Figures indicate like components.

DETAILED DESCRIPTION

Figure 1:
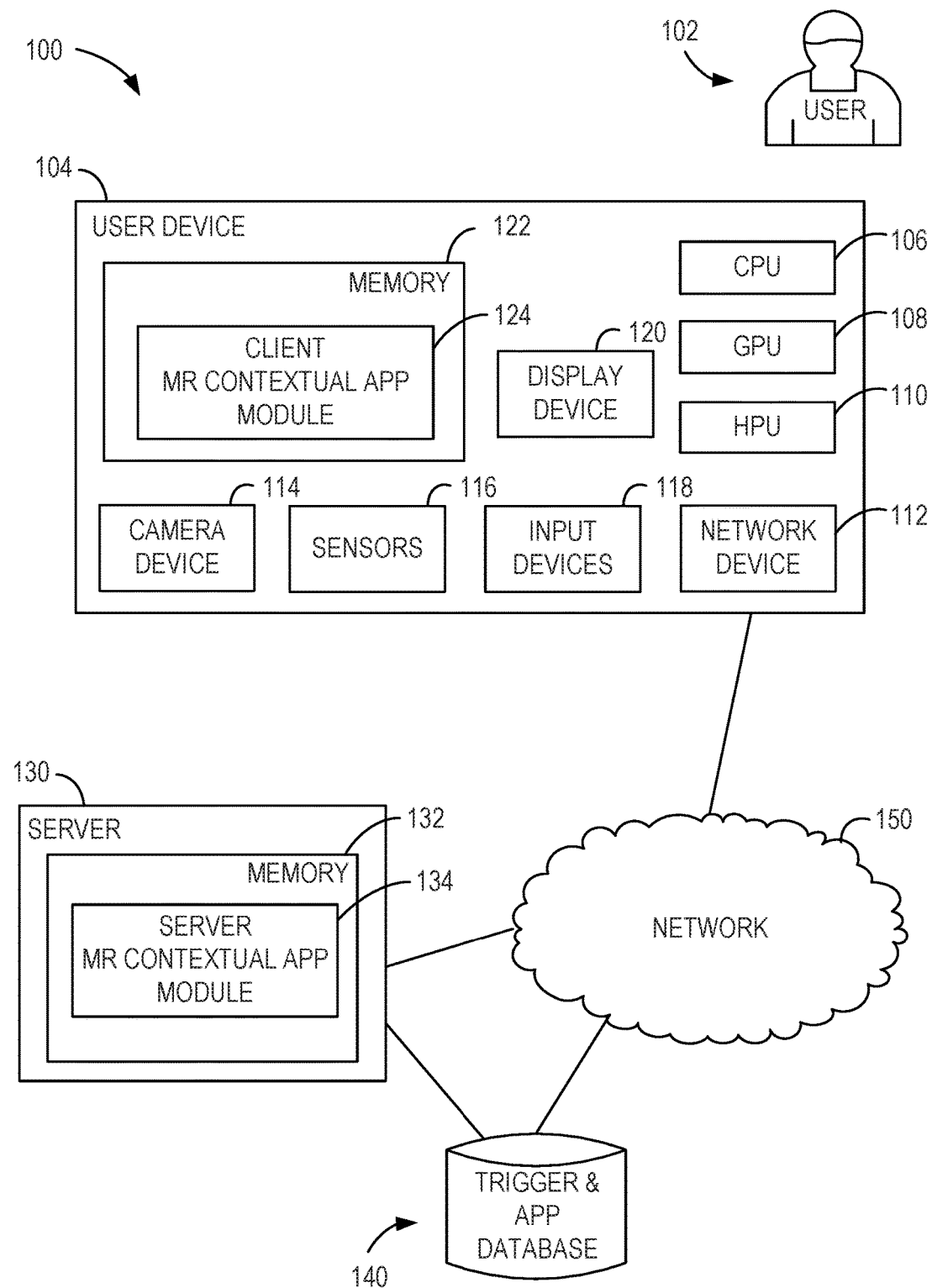
FIG. 1 is a diagram of an example MR contextual application (app) system and associated devices configured to provide MR contextual application functionality to a user.

The description that follows describes systems, methods, techniques, instruction sequences, and computing machine program products that constitute illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

A mixed reality (MR) system and associated methods are described herein. The MR system is configured to discover and present contextual applications to a user within an MR environment. In an example embodiment, a user (e.g., a wearer of an HMD, or someone holding a smartphone, tablet, or other MR-capable device) experiences the MR environment as presented by the MR system via an MR device. The MR environment includes a view of the real world (e.g., their immediate surroundings) along with virtual content provided by the MR system. The MR device, in some embodiments, includes a forward-facing camera configured to capture digital video or images of the real world around the user, optionally including depth data, which the MR system may analyze to provide some of the MR features described herein.

During operation, the MR system triggers contextual applications based on various contextual criteria. More specifically, in one example embodiment, the MR system identifies contextual criteria (also referred to herein as "trigger conditions" or "contextual triggers") which, when recognized as satisfied by the MR system, causes the MR system to initiate the execution and presentation of a contextual application to the user within the MR environment.

For example, an example application trigger may be configured to initiate a recipe application when the MR system determines that the user is in their kitchen or at a grocery store, and when cooking ingredients are recognized nearby (e.g., when the user is looking at canned goods in their pantry or on a shelf). The contextual criteria, in other words, are a set of criteria that depend on information from the user's surroundings. Such criteria may include, for example, the user's location, the proximity of real-world objects to the user, the specific state of user actions, absolute or relative time, or some combination thereof. As such, the contextual criteria of the application trigger refer to the real-time context (e.g., surroundings) within which the user finds themselves. In such an example, the contextual application may be configured to cause the MR system to present virtual objects proximate to certain real-world objects, such as an icon indicating prospective recipes presented over a canned good. As such, the user may interact with the virtual object, and thus the contextual application, to see the recipes identified by the contextual application.

To detect the presence of various real-world objects that may be implicated in the various application triggers, the MR system, in some embodiments, performs object detection using sensor data from the MR device (e.g., image processing on a live digital video feed from the MR device). The MR system may be configured to recognize three dimensional objects such as, for example, furniture (e.g., chair, table, cabinetry), structural building components (e.g., door, window, roof), or household items (e.g., grocery items, appliances). The MR system may identify objects based on their size, shape, texture, location, and various visual markings that may appear on the object. For example, a cylindrical object may be determined to be a canned good based on its location within a kitchen of the user, and may further be determined to be a can of mushroom soup based on a partial image of the label on the canned good. In some embodiments, matching camera depth sensing information to a 3d model via a trained neural network is used to detect triggers.

As the MR system determines various objects near the user, the MR system compares the detected objects to the various application triggers (e.g., the criteria for each trigger). When the MR system determines that an application trigger implicates one of the nearby objects (e.g., as one of the example criteria) and otherwise meets all of the contextual criteria for the application trigger, the MR system initiates the contextual application identified by the application trigger. Further, in some embodiments, the application trigger may be configured to initiate various actions within the triggered application. For example, the example application trigger described above may be configured to initiate a recipe application that provides recipes in which one or more of the detected cooking ingredients are used. As such, the MR system provides context-based triggering of applications within the MR environment.

In example embodiments, a method of implementing a plurality of contextual applications within a mixed reality (MR) environment on an MR-capable device of a user is disclosed. At least one real-world object is identified in the MR environment by applying an object recognition algorithm to one or more attributes of the at least one real-world object that are captured by sensors of the MR-capable device. A first contextual application of the plurality of contextual applications is used to determine an association between a first set of contextual triggers and a second contextual application of the plurality of contextual applications. A second contextual application is initiated based on a satisfying of the at least one contextual trigger. A function is invoked within the second contextual application based on an interaction of the user with at least one virtual object satisfying a second set of contextual triggers associated with the second contextual application.

In the description below, the term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs. In example embodiments, each of the various modules described herein is not merely a generic computing component; instead, it is a component that implements (e.g., via specialized programming logic) one or more of the specialized functions or operations (or combinations of the functions or operations) described herein.

FIG. 1 is a diagram of an example MR contextual application (app) system 100 and associated devices configured to provide MR contextual application functionality to a user 102. In the example embodiment, the MR contextual app system 100 includes a user device 104 operated by the user 102 and a server 130 coupled in networked communication with the user device 104 via a network 150 (e.g., a cellular network, a Wi-Fi network, the Internet, and so forth). The user device 104 is a computing device capable of providing a mixed reality experience to the user 102. In some embodiments, the user device 104 is a head-mounted display (HMD) device worn by the user 102, such as an augmented reality (AR) or virtual reality (VR) visor (e.g., Google Glass®, HTC Vive®, Microsoft HoloLens®, and so forth). In other embodiments, the user device 104 is a mobile computing device, such as a smartphone or a tablet computer.

In the example embodiment, the user device 104 includes one or more central processing units (CPUs) 106, graphics processing units (GPUs) 108, and holographic processing units (HPUs) 110. The user device 104 also includes one or more networking devices 112 (e.g., wired or wireless network adapters) for communicating across the network 150. The user device 104 further includes one or more camera devices 114 which may be configured to capture digital video of the real world near the user 102 during operation. The user device 104 may also include one or more sensors 116, such as a global positioning system (GPS) receiver (e.g., for determining a GPS location of the user device 104), biometric sensors (e.g., for capturing biometric data of the user 102), motion or position sensors (e.g., for capturing position data of the user 102 or other objects), or an audio microphone (e.g., for capturing sound data). Some sensors 116 may be external to the user device 104, and may be configured to wirelessly communicate with the user device 104 (e.g., such as used in the Microsoft Kinect®, Vive Tracker™, MIT's Lidar sensor, or MIT's wireless emotion detector).

The user device 104 also includes one or more input devices 118 such as, for example, a keyboard or keypad, mouse, pointing device, touchscreen, or hand-held device (e.g., hand motion tracking device). The user device 104 further includes one or more display devices 120, such as a touchscreen of a tablet or smartphone, or lenses or visor of a VR or AR HMD, which may be configured to display virtual objects to the user 102 in conjunction with a real-world view.

The user device 104 also includes a memory 122 configured to store a client MR contextual app module ("client module") 124. Further, the server 130 includes a memory 132 storing a server MR contextual app module ("server module") 134. During operation, the client MR contextual app module 124 and the server MR contextual app module 134 perform the various contextual app functionalities described herein. More specifically, in some embodiments, some functionality may be implemented within the client module 124 and other functionality may be implemented within the server module 134.

For example, the client module 124, executing on the user device 104 (e.g., an HMD), may be configured to capture data from the camera device 114 or sensors 116 to detect satisfaction of trigger conditions associated with an application trigger. In other embodiments, the server module 134 may process the captured data to detect satisfaction of trigger conditions. In the example embodiment, the camera device 114 and sensors 116 capture data from the surrounding environment, such as video, audio, depth information, GPS location, and so forth. The client module 124 may be configured to analyze the sensor data directly, or analyze processed sensor data (e.g., a real-time list of detected and identified objects, object shape data, depth maps, and the like). The client module 124 may search for specific trigger conditions in the data including, for example, the presence of objects, locations, symbols, logos, images, sounds near the user device 104, or identifiers of specific physical objects or surfaces, including fiducial markers.

In example embodiments, each application trigger configuration includes one or more trigger conditions, application logic or interaction mechanics for how the application interacts with the user, and an asset bundle that may include, for example, 2D/3D visuals and audio that are displayed to the user to provide an MR experience. The application trigger configuration may be stored within the client module 124, or within the server 130 or database 140. In some embodiments, trigger conditions may include time limitations (e.g., particular times of day, or an amount of relative time since a past event), position or location limitations (e.g., the user device 104 being within a particular location, or within a certain distance of a certain type of object, or detecting a particular object within a certain distance of another object or sound), or various combinations thereof.

Upon detection of the trigger conditions, the MR system 100 initiates a contextual application identified by the associated application trigger. For example, detection of a serial number on a coffee machine may trigger a coffee app, or detection of a marker on a table may activate a computer game. In some embodiments, the MR system 100 may also include an app database 140, which may be configured to store contextual applications and associated data. Execution of such contextual applications may include creating and displaying virtual objects to the user 102 (e.g., in relation to associated real-world objects within the field of view of the user 102). These virtual objects may be associated with the contextual application, and user interaction with the virtual objects may cause further actions by the associated contextual application, as described in further detail below.

Figure 2:
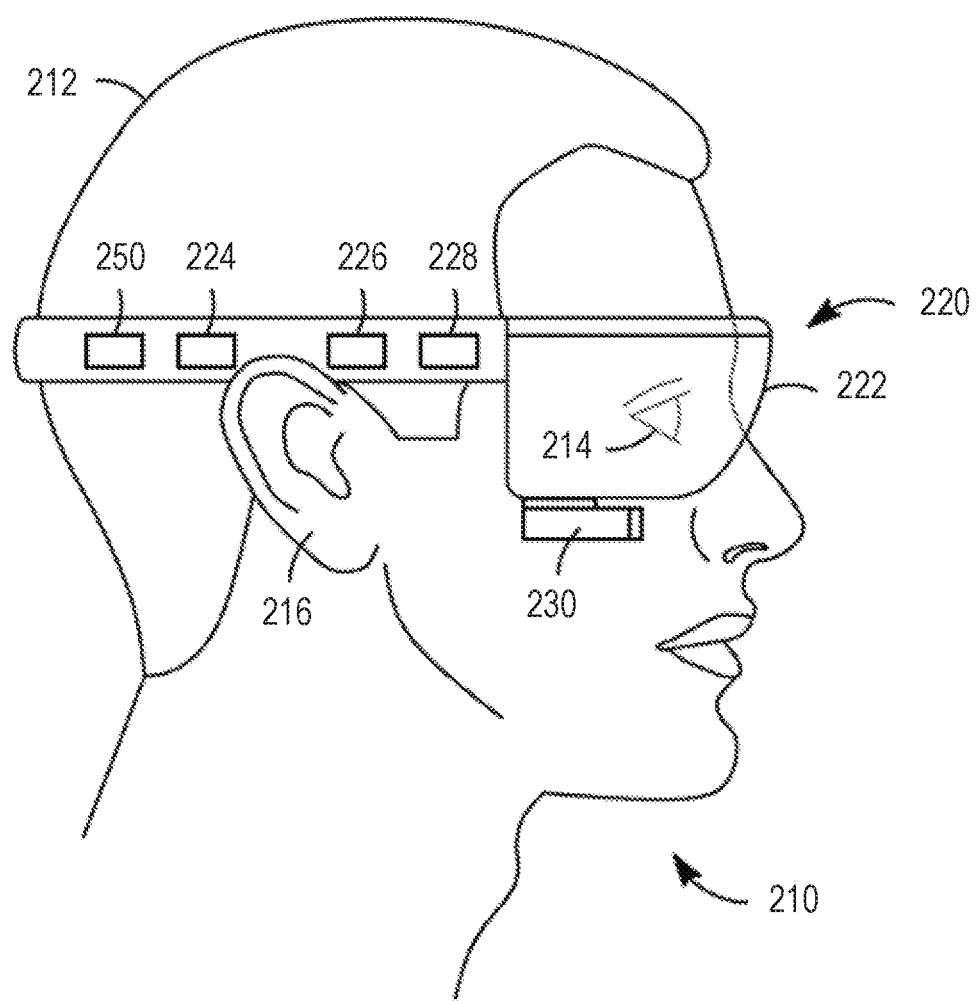
FIG. 2 is a diagram of an example HMD, worn by a user (or "wearer"), and configured to perform as the user device of the MR system.

FIG. 2 is a diagram of an example HMD 220, worn by a user (or "wearer") 210, and configured to perform as the user device 104 of the MR system 100. In some embodiments, the HMD 220 is similar to the user device 104, and may include any or all of the components of the user device 104, though not all are separately identified in FIG. 2. In the example embodiment, the HMD device 220 includes a transparent or semi-transparent visor (or "lens", or "lenses") 222 through which the wearer 210 views their surroundings (also herein referred to also as "the real world"). In other embodiments, the HMD device 220 may include an opaque visor 222 which may obscure the wearer 210's view of the real world, but may present the wearer 210 a view of their surroundings via input from a digital camera device 230.

In the example embodiment, the HMD 220 also includes a display device 228 that renders graphics (e.g., virtual objects) onto the visor 222. As such, the visor 222 acts as a "screen" or surface on which the output of the display device 228 appears, and through which the wearer 210 experiences virtual content. The display device 228 is driven or controlled by one or more GPUs 226 or HPUs. The GPU 226 processes aspects of graphical output that assists in speeding up rendering of output through the display device 228. In some embodiments, the visor 222 and display processor 228 may be similar to the display device 120 and the GPU 108 or HPU 110.

In the example embodiment, the HMD device 220 also includes a central processor 224 that may execute some of the operations and methods described herein (e.g., executing the client module 124). The HMD device 220 also includes an audio device 250 that is configured to present audio output to the wearer 210 (e.g., via ears 216). While not separately shown, the HMD device 220 also includes a network device similar to the network device 112, and may communicate with the server 130 or app database 140 during operation.

In some embodiments, the HMD device 220 includes the digital camera device 230. The digital camera device (or just "camera") 230 is a forward-facing video input device that is oriented so as to cover at least a portion of a field of view (FOV) of the wearer 210. In other words, the camera 230 captures or "sees" an angle of view of the real world based on the orientation of the HMD device 220 (e.g., similar to what the wearer 210 sees in the wearer 210's FOV when looking through the visor 222). The digital video from the camera device 230 may be analyzed to detect various trigger conditions, such as detecting types of objects near the wearer 210, or determining distance to those objects. In some embodiments, output from the digital camera device 230 may be projected onto the visor 222 (e.g., in opaque visor embodiments), and may also include additional virtual content (e.g., added to the camera output).

In some embodiments, the HMD device 220 may include one or more sensors 116 (not separately shown in FIG. 2), or may be coupled in wired or wireless communication with the sensors 112 (e.g., near-field communication (NFC) with a wrist-wearable device also worn by the wearer 210). For example, the HMD 220 may include motion or position sensors configured to determine a position or orientation of the HMD 220.

During operation, the HMD 220 is mounted over both eyes 214 of the wearer 210, as shown in FIG. 2. As the HMD 220 captures and analyzes video and sensor data, the client module 124 detects trigger conditions associated with various application triggers. When the trigger conditions for a particular application trigger are satisfied, the HMD 220 executes the associated contextual application. Some contextual applications may cause the HMD 220 to display additional virtual content (e.g., virtual objects) to the wearer 210, and may allow the wearer 210 to interact with those virtual objects. Such interactions may further engage the contextual application for additional functional processing associated with the virtual object. As such, the HMD 220 provides contextual application functionality to the wearer 210 as the wearer 210 experiences a mixed reality environment.

In some embodiments, the HMD 220 may provide a fully-immersive VR environment. As such, the MR system 100 detects virtual objects which may activate application triggers that cause presentation of contextual applications to the user 210 within the virtual environment when the contextual criteria are satisfied. For example, the user 210 may be experiencing a virtual environment that includes a street and a series of shops and restaurants. The user 210 may pass a virtual Pizza Hut® restaurant, whereby the client module 124 may detect the presence of the virtual restaurant, download a contextual application associated with the real Pizza Hut company, and provide the app to the user 210. As such, the user 210 may then order a real pizza from the real restaurant through the contextual application presented within the virtual environment.

In one example embodiment, the client module 124 continuously runs and communicates with the server 130, sending contextual data such as, for example, GPS coordinates, time of day, recognized objects in the environment, recognized fiducial markers (e.g., images), or raw video. The server 130 may include rules for optimizing performance in the client module 124 such as, for example, the client module 124 may be disabled from 3D object detection for a particular geographic area that does not contain MR apps that are triggered by physical objects. The client module 124 may operate as a contextual app launcher and scheduler, and thus may be referred to herein as an "MR operating system". The client module 124 may stream contextual apps' compressed packages (e.g., from the server 130), and decompress and run the app locally. The client module 124 executes the app's rules (e.g., scripts that define interaction and rendering rules) and renders audio and visual assets accordingly. The visual assets may be, for example, synthetic 3D models or 2D images that become virtual objects with which the user can potentially interact. Audio assets can be spatialized 3D sound effects or music, or mono sounds. As part of the application interaction rules, haptic responses may also be initiated.

In some embodiments, the client module 124 may run more than one contextual app at the same time. For example, presume a coffee mug is in the user's view and it is 6 pm. As such, one app may be triggered by the mug (e.g., displaying 3D animated particles around the mug and a dolphin jumping in and out of it), and another may be triggered by the current time (e.g., displaying a virtual TV screen playing the local news). The client module 124 schedules, starts, and stops the apps, and runs them simultaneously if applicable.

Interaction rules define how the app responds to user actions. User actions may be, for example, voice commands, physical gestures (e.g., move arms or body, eye gaze movement, blinking, and so forth), interaction with the input devices 118 (e.g., controllers, 3D mouse, and so forth), or actions on an interactive display device 120. Responses to user actions may be, for example, modifying the rendered visuals (e.g., 2D/3D objects), audio, or haptic feedback.

Figure 3:
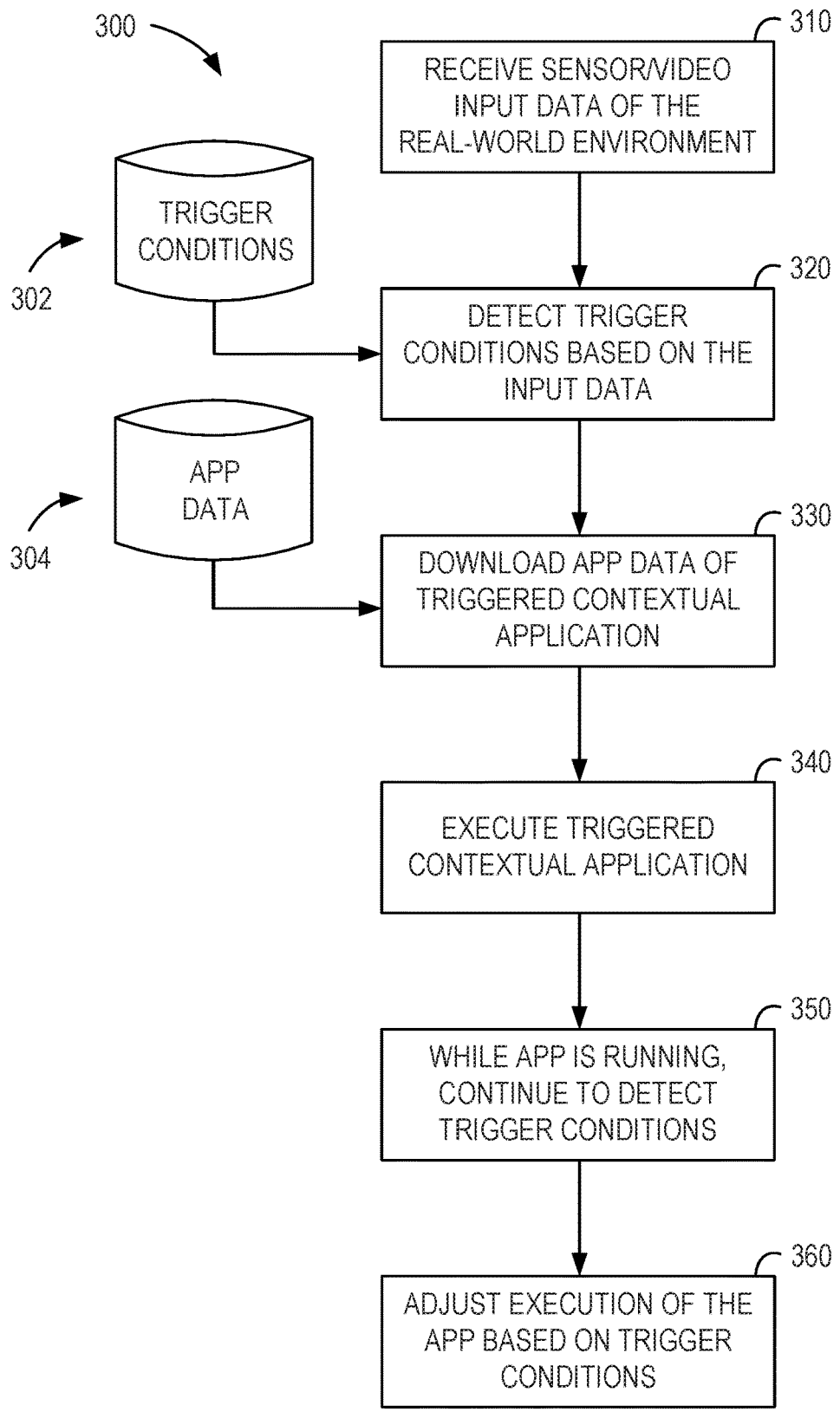
FIG. 3 is a flowchart of an example method for providing contextual applications to the user as they experience an MR environment provided by the MR system.

FIG. 3 is a flowchart of an example method 300 for providing contextual applications to the user 102 as they experience an MR environment provided by the MR system 100. In the example embodiment, the user 102 wears the HMD 220 shown in FIG. 2 as they move around a real-world environment (e.g., walking around in a room, or along a street). As the user 102 experiences the real-world environment, the various sensors 116 on the HMD 220 (e.g., the camera device 230) capture input data of that environment (see operation 310). At operation 320, the client module 124 analyzes the input data to detect trigger conditions 302 of an application trigger (see operation 320). Trigger conditions 302 may be stored in and retrieved from the trigger and app database 140 prior to monitoring for the particular application trigger.

In some embodiments, one or more of the trigger conditions 302 may involve detection of a particular type of real-world object within the environment. For example, the client module 124 may analyze the camera video to detect a 3-dimensional (3D) object such as a chair or a box. As such, operation 310 may include identifying 3D objects within the real-world environment to detect such trigger conditions 302. Operation 310 can include using artificial intelligence object recognition algorithms in order to identify objects within the user's environment. As 3D objects and other information about those objects (e.g., logos or information appearing on the objects, distance from the user 102) are identified, the object information for those 3D objects is compared with the trigger conditions 302 to detect whether all trigger conditions for the particular application trigger are met.

In some embodiments, the trigger conditions 302 of the application trigger may be pre-loaded onto the HMD 220 (e.g., a priori), and the client module 124 may be configured to detect those particular trigger conditions (e.g., at operation 320). In other embodiments, various current conditions may be detected without pre-loading of the specific trigger conditions for the application trigger, and the MR system 100 may then determine that the current conditions match and satisfy the set of trigger conditions associated with the application trigger (e.g., a posteriori).

When the client module 124 detects that the trigger conditions 302 for a particular application trigger are satisfied, then the client module 124 downloads app data of that application trigger (see operation 330) and initiates execution of the contextual application associated with that application trigger (see operation 340). For example, the contextual application may identify visuals or sounds that may be presented relative to specific real-world object. In some embodiments, executing the contextual application at operation 340 may include creating one or more virtual objects associated with the app and presenting those virtual objects to the user 102 within a MR environment (e.g., as depicted in FIGS. 5-10D). Such virtual objects may be displayed relative to particular real-world objects (e.g., over or near one of the objects identified in the trigger conditions). Those virtual objects may be configured with various interactive actions (e.g., based on the app data 304), through which the user 102 may further activate functionality provided by the app.

At operation 350, the client module 124 continues to detect trigger conditions while the app is running In some embodiments, additional application triggers may be loaded and/or detected, either independent of the active application trigger, or as an additional (e.g., nested) application trigger associated with the active trigger. For example, once a first trigger is activated (e.g., causing a first virtual object to be created and displayed), that parent application trigger may initiate monitoring for a second, child application trigger. In other words, the child application trigger may be configured to be monitored and detected only after the parent application trigger is activated.

At operation 360, the client module 124 may adjust the execution of the app based on existing or changing trigger conditions. For example, a "Carte Blanche app" may be active in a private reality layer and have trigger conditions of: GPS coordinates within the user 100's house and a volume that encompasses the house's extension, or perhaps only the living room. The interaction actions may include: (1) on startup, render a deck of cards on the surface of a table; (2) on startup, allow other users 100 to join, which may subsequently trigger a notification to nearby users 100 to join the session; (3) when any user 100 taps on any card (e.g., physically touches the table, or if the cards are hovering, then a finger detection on the location where the virtual card is displayed), animate the card flipping over; (4) when any user picks a card (e.g., executes a picking gesture with their hand on the location that the card is displayed), start moving the card to follow the user 100's hand; and (5)

when any user performs a dropping gesture of dropping the card, render a virtual 3D object associated with the card and play a sound.

Figure 4:
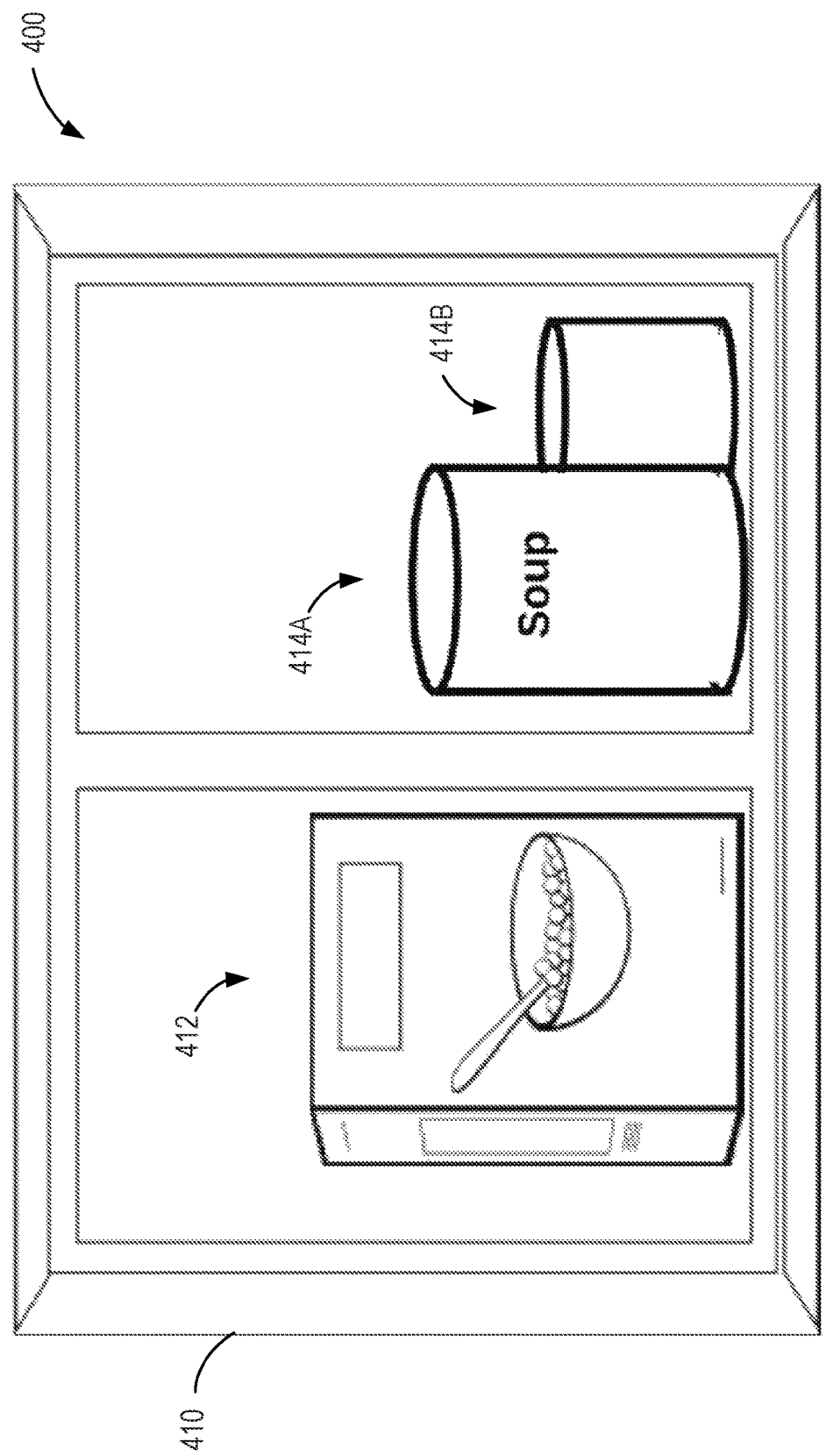
FIG. 4 illustrates an example real-world environment that may be evaluated by the MR system.

FIG. 4 illustrates an example real-world environment 400 that may be evaluated by the MR system 100. In the example embodiment, the real-world environment 400 includes a kitchen cabinet 410. Inside the kitchen cabinet are a box of cereal 412 and two cans of soup 414A, 414B. In the example shown here, FIG. 4 illustrates a front view of the kitchen cabinet 410. During operation, the user 102 may view the kitchen cabinet 410 and its contents as shown while operating the user device 104. In some embodiments, the user 102 may be wearing the HMD 220. In other embodiments, the user 102 may be holding a smartphone or tablet. Accordingly, and as further shown in FIGS. 5 and 6, the user device 104 collects sensor data from the real-world environment 400, such as digital video of the cabinet 410 and contents via the camera device 114.

Figure 5:
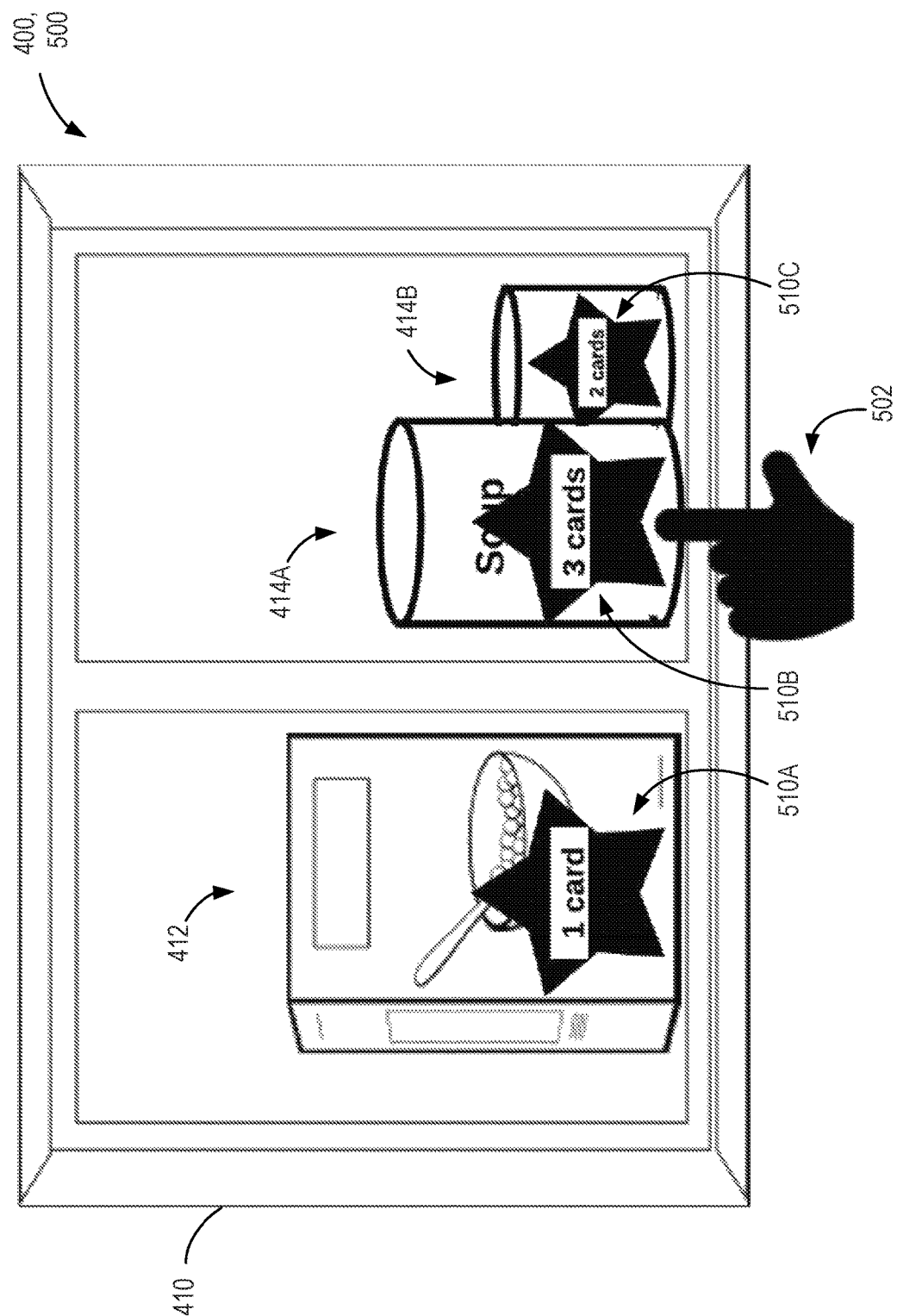
FIGS. 5 and 6 illustrate an MR environment as presented to the user by the MR system via the user device.
Figure 6:
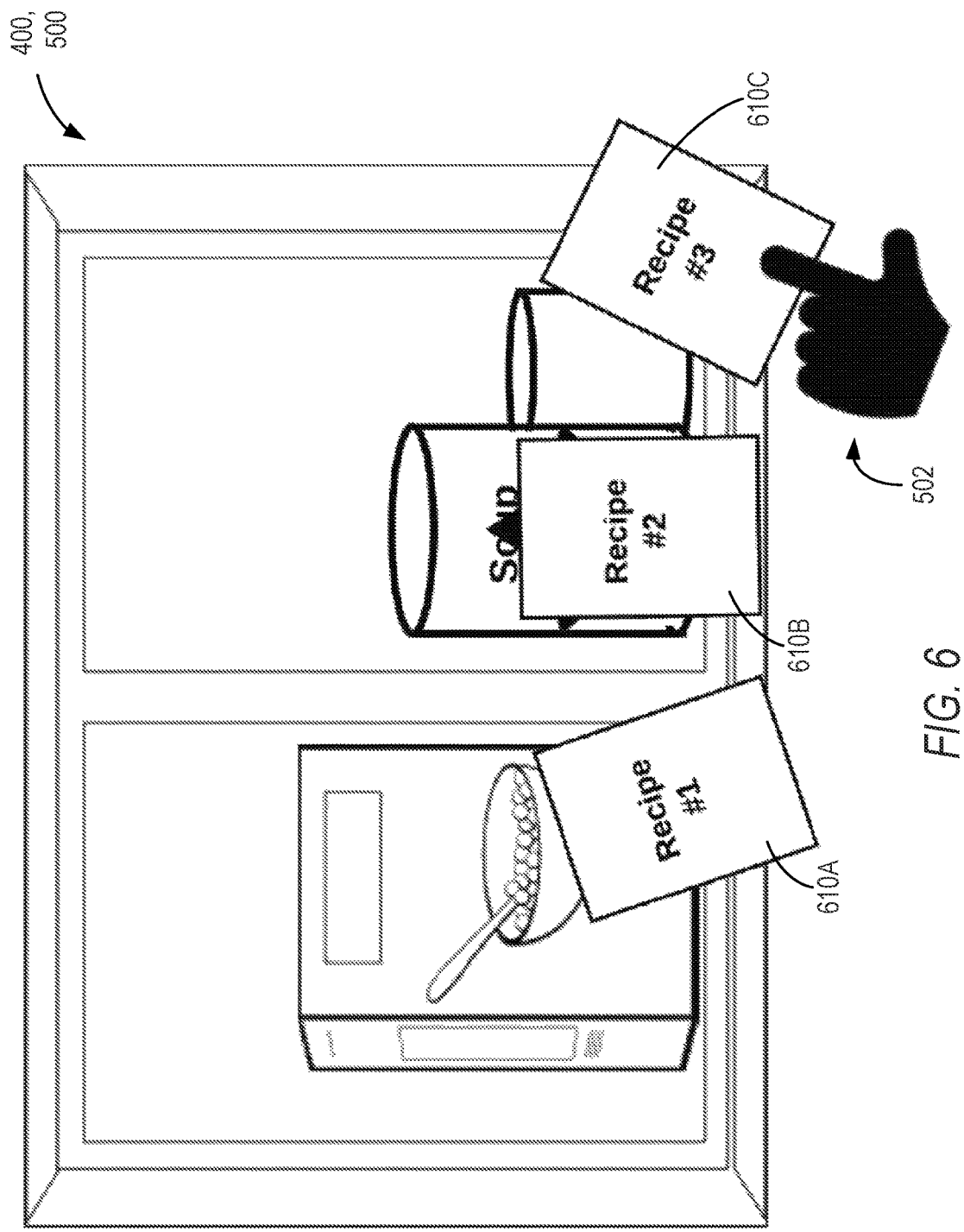

FIGS. 5 and 6 illustrate an MR environment 500 as presented to the user 102 by the MR system 100 via the user device 104. In the example embodiment, the user 102 wears the HMD 220 while viewing the real-world environment 400. Further, and as illustrated in FIGS. 5 and 6, the MR system 100 (e.g., the client module 124) presents various virtual objects within the MR environment 500. Accordingly, it should be understood that the MR environment 500 includes both a view of the real-world environment 400 and the various virtual objects.

At a first point in time, and as shown in FIG. 5, the MR environment 500 includes several recipe indicator objects 510A, 510B, 510C (collectively, objects 510). In the example embodiment, the objects 510 are virtual objects presented by the HMD 220, and appear as "stars" positioned over certain real-world objects with which they are affiliated (e.g., box of cereal 412 and cans of soup 414).

During operation, prior to displaying the objects 510, the client module 124 captures input data from the HMD 220 in real time (e.g., digital video from the camera 230) and detects the presence of the three real-world objects 412, 414A, 414B (e.g., using 3D object detection techniques). Further, the client module 124 also determines that one of the cans of soup 414A is a can of mushroom soup (e.g., based on the shape of the object as a cylinder, and analysis of a label appearing on the can of soup 414A). The client module 124 searches the trigger & app database and determines that this type of object (e.g., canned good, can of mushroom soup, cooking ingredient) is associated with a particular contextual application (e.g., a recipe application). Further, the client module 124 may execute the contextual application to determine whether and how many recipes this particular cooking ingredient is associated with (e.g., based on the type of cooking ingredient, recipes involving mushroom soup).

In the example shown in FIG. 5, the contextual application identifies three recipes involving the can of soup 414A. As such, the client module 124 generates a virtual object 510B (e.g., a star object including the text "3 cards", representing the three recipes found by the app) and displays that virtual object 510B at the location of the associated real-world object (e.g., the can of soup 414A).

Similarly, the MR system 100 determines the number of recipes associated with the box of cereal 412 and the other can of soup 414B, generates virtual objects 510A, 510C for those real-world objects 412, 414B, and displays those virtual objects 510A, 510C at the location of the associated real-world objects, respectively. In this example, the contextual app identifies one recipe associated with the box of cereal 412 and two recipes associated with the other can of soup 414B.

In the example embodiment, each of the virtual objects 510 include one or more pre-defined interaction actions 510. Each interaction action identifies a user action (e.g., a hand gesture, a gaze focus) which, when taken by the user, causes a reciprocal application response (e.g., visual rendering, audio playback, haptic feedback). In this example, each recipe object 510 includes a "touch" interactive action that engages the contextual app to display associated recipes when the virtual object 510 is touched by a hand 502 of the user 102. In some embodiments, the virtual objects 510 may be placed in a static location in 3D coordinate space (e.g., overlaid onto a real-world object), thereby causing the user 100 to have to touch or almost physically touch the object itself in order to activate any touching gestures associated with the virtual object 510. In some embodiments, the virtual objects 510 may be positioned between the user 100 and the associated real-world object, and in line of sight with the real-world object such that the virtual object 510 looks to be "on" the physical object from the perspective of the user 100, but is instead within an arm's reach of the user 100 such that the user 100 can interact with the virtual object 510 without having to be within arm's reach of the real-world object. As such, as the user 100 moves, the virtual objects 510 may be repositioned to keep the virtual objects 510 in line with the real-world objects as viewed by the user 100.

In the example embodiment, the user 102 touches the virtual object 510B associated with the can of soup 414A, thereby activating the display of recipes associated with mushroom soup. FIG. 6 illustrates a reciprocal response to this touch action within the MR environment 500. In the example embodiment, and in response to the touch action, the MR system 100 displays three recipe card objects 610A, 610B, 610C (collectively, recipe cards 610), one for each recipe identified by the contextual application. Each recipe card 610 is a virtual object, and may be displayed on or near the associated real-world object (e.g., can of soup 414A) or parent virtual object (e.g., recipe indicator object 510B). In some embodiments, the recipe card object 610 may identify summary information about the underlying recipe, such as a title of the recipe, a cooking time, or other key ingredients needed, such that the user 102 can quickly see significant information about the recipe.

Similar to the recipe indicator objects 510, each of the recipe card objects 610 may also include one or more interactive actions and associated reciprocal responses (e.g., that correspond to functions of the contextual application). Example reciprocal responses to interactive actions performed on the recipe card objects 610 include displaying detailed recipe information about the associated recipe (e.g., list of ingredients, cooking instructions, number of people served, preparation time, needed cooking appliances, dishes, and so forth), comparing the list of ingredients to a list of present ingredients to determine any missing ingredients (e.g., based on a current inventory, or based on other ingredients identified as nearby), or initiating step-by-step cooking instructions. In the example embodiment, the user 102 chooses the recipe card 610C, and the contextual application provides step-by-step cooking instructions to the user 102 via the MR system 100 and MR environment 500. In accordance with another embodiment, the recipe card objects 610 may appear as virtual copies of the object itself (e.g., as cans of soup each denoting a different recipe), and the pre-defined interaction action involves the user utilizing the physical can (e.g., moving the can) to select from the objects 610. In this example, each recipe object 610 includes a "touch" interactive action that engages the contextual app to display associated recipes when the physical object of the can is placed in the same position and orientation as one of the virtual objects 610. The physical object of the can is used as a controller, and specifically in this case as a selector.

In this step-by-step cooking instructions example, the MR system 100 determines that the user 102 is in their home kitchen (e.g., based on GPS location, visual image recognition of the room, or based on real-world object detection of stove, refrigerator, and so forth). Further, the MR system 100 may similarly detect nearby real-world objects associated with the recipe, such as other cooking ingredients, appliances, dishes, pots, pans, or utensils identified by the recipe. The contextual application may identify and activate additional application triggers associated with such objects.

In some embodiments, the contextual application may include a set of steps or goals to accomplish over time. For example, a contextual application may have three layers: a first layer may include trigger conditions that start the process; a second layer may include the goals to accomplish over time (e.g., via multiple nested contextual applications); and a third layer identifying completion (e.g., a set of completion criteria to terminate the parent contextual application).

In some embodiments, image based matching of the location surrounding the user is used to detect triggers. In the embodiments, an entity such as a company with a physical presence at the location (e.g., a brick and mortar building or store) creates images of the location that are used in the image matching. The images (or any image matching information extracted from the images) created by the entity can be stored on a server as part of the trigger conditions 302 for use in the image matching during the process 320 of detecting trigger conditions. The images can include exterior images of a building or storefront, images from inside the building or storefront, and images of products within the store. During operation, as the user moves the MR device 104 at the location, the video data (e.g., frames from the video) from the device is compared with the images created by the entity; the comparison using image matching techniques in order to find matches (e.g., as part of a trigger) and initiate the execution of one or more contextual applications. In accordance with an embodiment, the detecting trigger conditions 320 includes an artificial intelligence agent that completes the image matching process using artificial intelligence for image recognition/matching. In example embodiments, the artificial intelligence includes application of machine-learning techniques for identifying three-dimensional objects in three-dimensional real-world environments (e.g., based on one or more attributes associated with the three-dimensional objects). In example embodiments, the one or more attributes incorporated into the machine-learning techniques may include size, shape, color, texture, position, orientation, context (e.g., in relation to other virtual objects in the real-world environment), location (e.g., GPS or other location information), dimensions (e.g., height, width, and depth), and so on.

In some embodiments the contextual application linked to a trigger can be configured to launch an advertisement or a game associated with that trigger. In the embodiment, the application data 304 could include the advertisement data or game data. As an example, consider a company such as Starbucks Inc. and further consider a specific first coffee shop at a first location and a second coffee shop at a second location. An individual (e.g., employee or contractor) would take pictures of the first coffee shop (e.g., inside, outside and product shots) and pictures of the second coffee shop and include the pictures as part of the trigger conditions 302. During operation, a user would approach the exterior of the first coffee shop and the user device 104 would collect video data of the exterior of the first coffee shop. During the operation 320 for detecting of trigger conditions, the video data would be compared to the pictures (e.g., in the trigger conditions 302) of the first coffee shop and if a trigger was found, a contextual application (e.g., an advertisement) for the first coffee shop would execute on the device 104; perhaps offering the user points, or discounts contingent on the user entering the first coffee shop. Furthermore, if the user enters the first coffee shop, the user device 104 would collect video data of the interior of the first coffee shop thus confirming the user has entered and fulfilled a requirement (e.g., the requirement of entering the coffee shop) of the contextual application. Once inside the first coffee shop, the contextual app could continue to monitor the data from the user device 104 to detect further triggers based on the video data of the interior and further offer the user additional points, or discounts for merchandise within the store. There can be one single contextual application for all the locations of an entity; for example, the contextual application for the first coffee shop and the contextual application for the second coffee shop can be the same. There can be one single contextual application for each individual location of an entity; for example, the contextual application for the first coffee shop can be different from the contextual application for the second coffee shop.

In some embodiments, user matching camera depth sensing information to a 3d model via a trained neural network is used to detect triggers.

Figure 7:
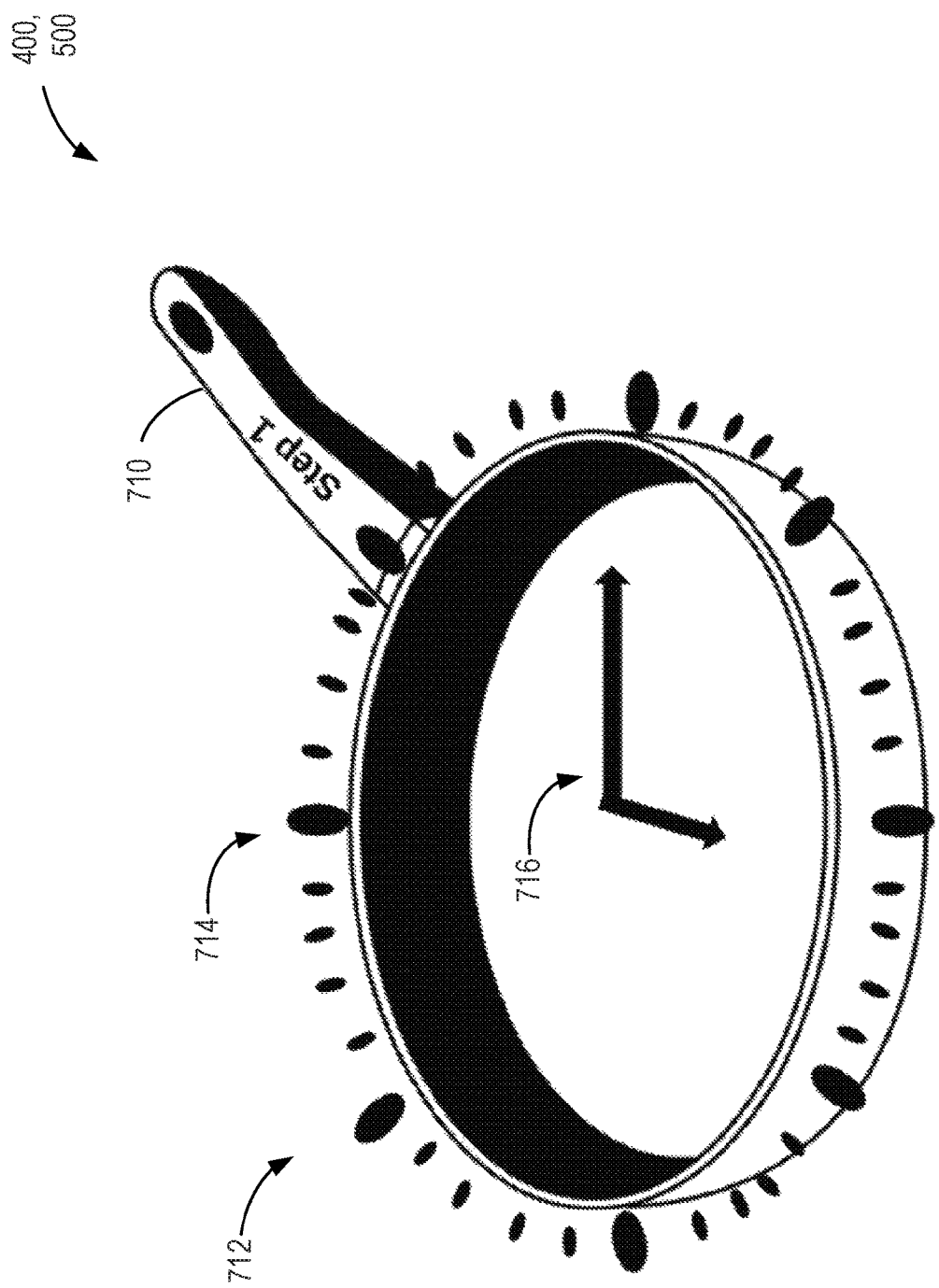
FIG. 7 illustrates an example cooking pan detected by the MR system within the real-world environment as presented to the user by the MR system via the user device.

FIG. 7 illustrates an example cooking pan 710 detected by the MR system 100 within the real-world environment 400. In the example embodiment, the example recipe activated as described above with respect to FIG. 6 indicates the use of a pan in a "Step 1" of preparation instructions for the recipe. As such, when the step-by-step instructions contextual application is activated, the contextual application may identify an application trigger involving detection of a pan object for "Step 1" of the preparation instructions.

The pan 710 may, for example, be sitting out on a stove in the kitchen of the user 102 and, as such, may be recognized as a 3D object in the real-world environment 400 by the MR system 100. When the MR system 100 detects the pan 710, a cooking instruction for "Step 1" is initiated. In the example embodiment, the MR system 100 presents additional virtual objects associated with this cooking step and the pan 710 within the MR environment 500. More specifically, the MR system 100 displays a virtual timer 712 relative to the pan 710. The virtual timer 712 includes dial markers around a perimeter of the pan 712 (e.g., representing a 60-second minute, or a 60-minute hour) and one or more arms 716 at a center of the pan 712.

During operation, "Step 1" may identify pre-heating the pan 710 for 60 seconds, or may identify heating the mushroom soup in the pan 710 for 15 minutes on a low heat. As such, the virtual timer 712 may be configured to count down or up based on the amount of time indicated, thereby providing a visual indication of the time called for by "Step 1", allowing the user 102 to track that step to completion. Similarly, and in conjunction with the contextual application, the MR system 100 continues to detect trigger conditions and interact with the user 102 until the user 102 dismisses the application or the contextual application is completed.

Figure 8A:
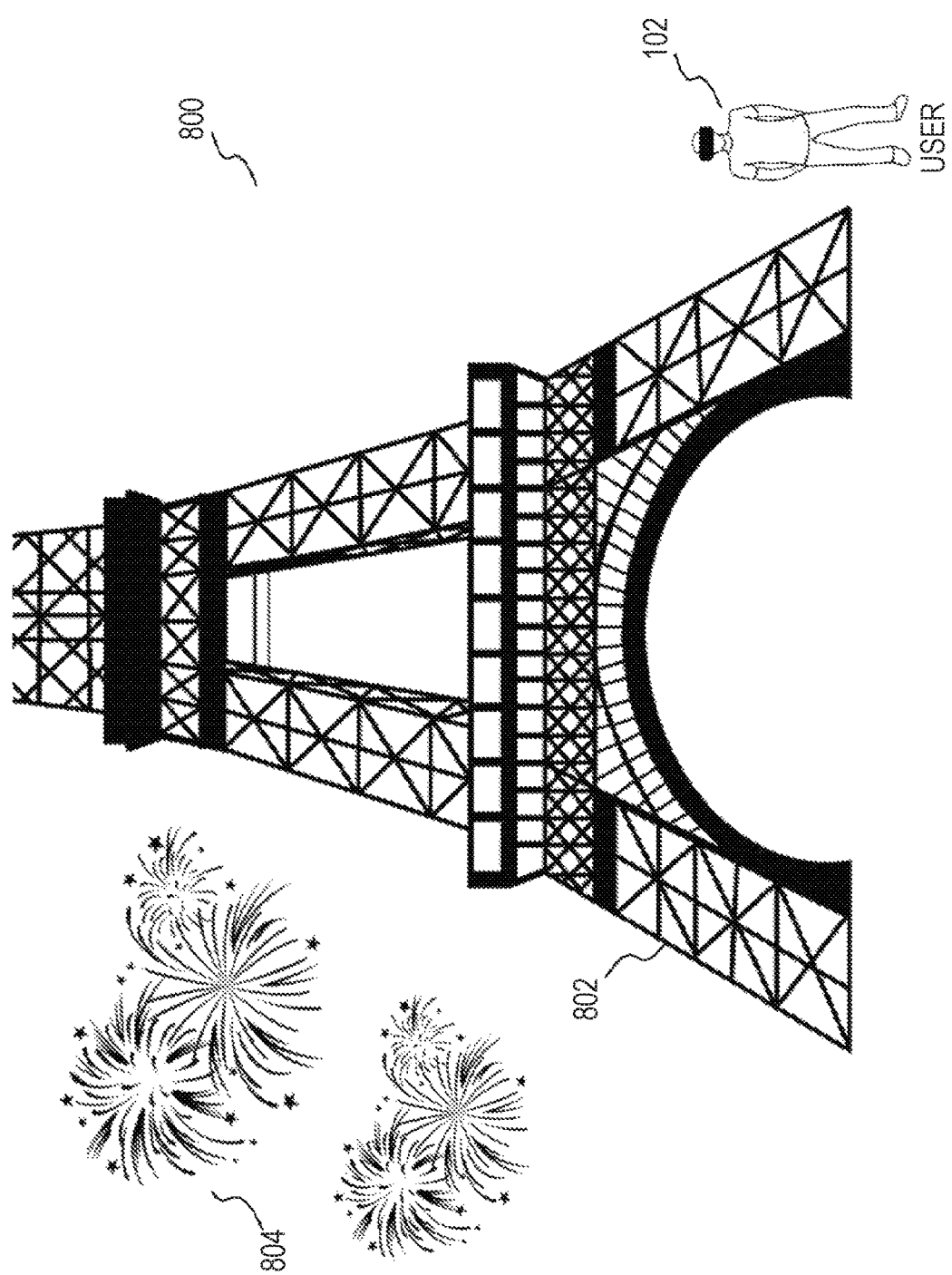
FIGS. 8A and 8B illustrate two example layers offering different contextual applications.
Figure 8B:
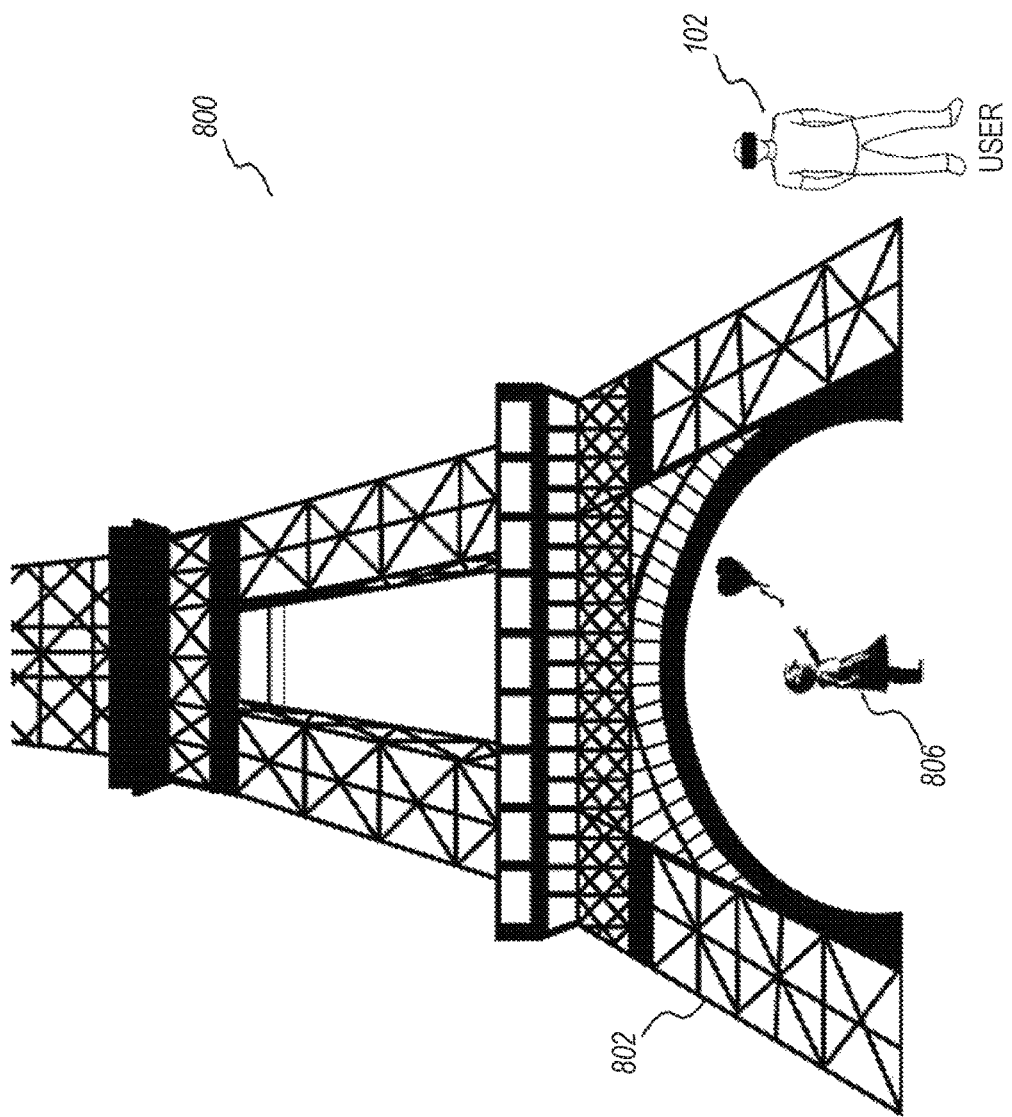

FIGS. 8A and 8B illustrate two example layers offering different contextual applications. In FIG. 8A, the MR system 100 presents an MR environment 800 that includes both real-world objects as well as virtual objects associated with a sponsor layer. In the example embodiment, the user 102 wears the HMD 220 while viewing the Eiffel Tower 802 (e.g., a real-world object in the environment 800). In addition, the sponsors of the Eiffel Tower (e.g., the Council of Paris) have created a contextual application associated with a tour application for the Eiffel Tower (e.g., a tourist MR application), represented by a virtual tour object 804.

During operation, as the user 102 views the Eiffel Tower 802, the MR system 100 detects that the user 102 is viewing the Tower 802 (e.g., via image recognition, or based on geo-location and field of view of the user device 104). Further, the MR system 100 determines that the client module 124 is currently configured to present the sponsor layer, and that the sponsor layer includes a contextual application associated with the Eiffel Tower 802. As such, the MR system 100 creates and displays the virtual tour object 804 (e.g., fireworks) within the HMD 220 near the Tower 802, allowing the user 102 to activate the contextual application.

In FIG. 8B, the client module 124 is configured to present a user-generated layer. In the example embodiment, the user-generated layer may include contextual applications published by other users 102. For example, a local artist may create a contextual application in which they make available an MR art work viewing for users 102 near the Tower 802, as represented by the virtual object 806. During operation, as the user 102 views the Eiffel Tower 802, or when the user 102 is near a particular location (e.g., as set by the artist), the MR system 100 determines that the client module 124 is currently configured to present the user-generated layer, and that the user-generated layer includes a contextual application associated with the Eiffel Tower 802 or that particular location. As such, the MR system 100 creates and displays the virtual object 806, allowing the user 102 to activate the associated user-generated contextual application.

Figure 9:
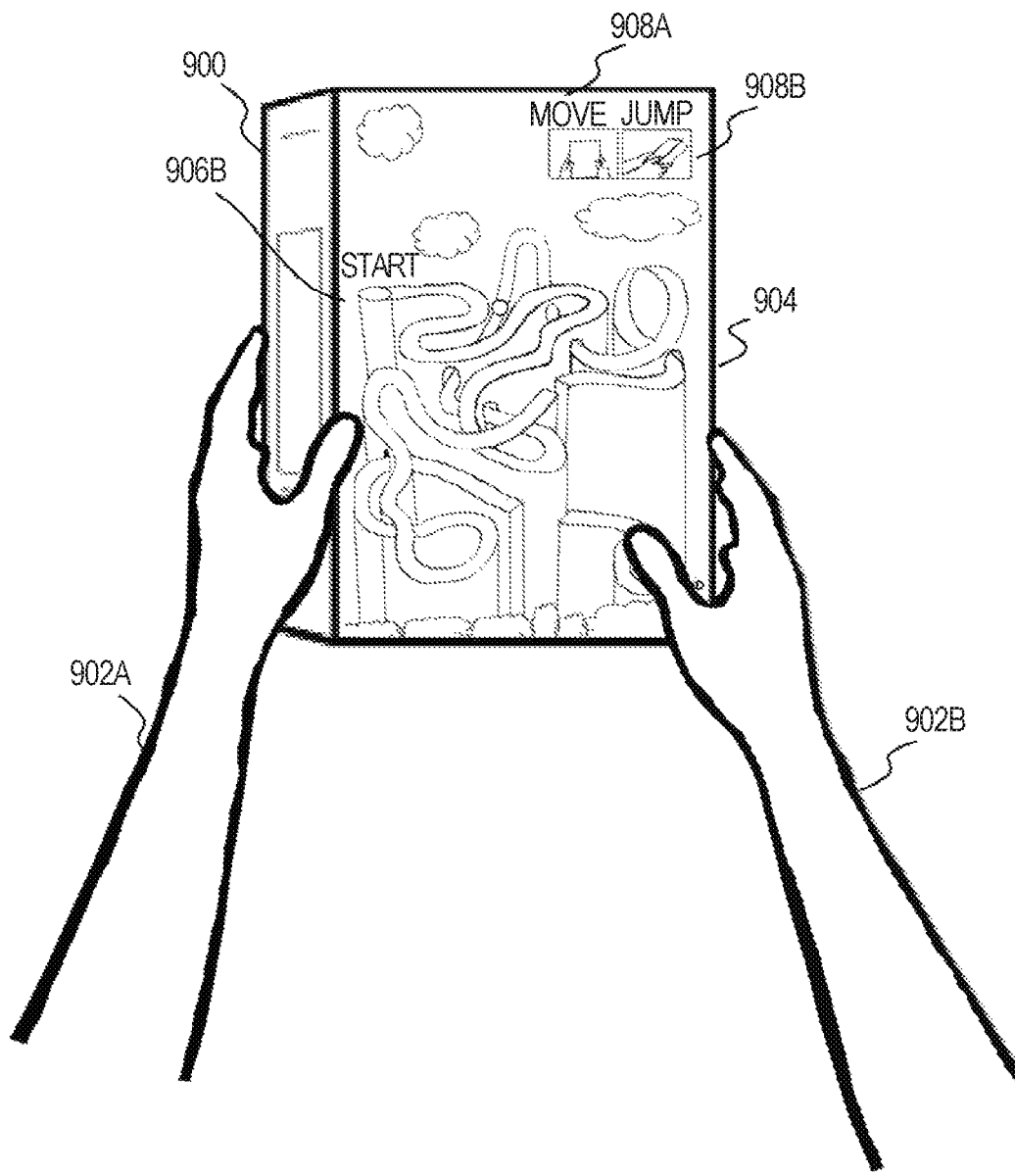
FIG. 9 illustrates an example MR environment showing a cereal box game as presented to the user by the MR system via the user device, in accordance with an embodiment.

In accordance with an embodiment and referring again to FIG. 3, executing the contextual application at operation 340 includes morphing the displayed application to the physical dimensions of an object (e.g., a triggering object) in the user's 102 environment and using the real-time motion (e.g., physics) of the object to control aspects within the contextual application (e.g., to control the motion of a game character). The morphing includes detecting any of the type, shape, dimensions and motion of the object and adjusting the display of the contextual application to fit the size and orientation of the object as it moves within the environment. The motion includes the full three dimensions of rotation and three dimensions of translation. For example, at operation 310, the client module 124 might detect the user is holding a rectangular cereal box that would act as a contextual trigger for either a specific game designed for that particular box, or a generic cereal box game that could be played on any cereal box. FIG. 9 is a first person perspective view of the environment showing an example wherein the user 102 is holding a cereal box 900 between his hands (902A and 902B). In the example, a static traditional maze game 904 (e.g., one that is traditionally completed with a pencil) is printed on the back side of the box 900. The cereal box 900 acts as a trigger for a mixed reality game contextual application wherein the client module 124 displays a mixed reality version of the maze game on top of the static printed game version (the mixed reality version of the game is not separately shown in FIG. 9). The client module 124 downloads (e.g., according to operation 330 described in relation to FIG. 3) the application data and displays the game by morphing the game to the dimensions and orientation of the box in the user's hand using the detected shape, dimensions and orientation of the object. The client module 124 tracks the movement of the box 900 using any convenient method including object detection via the camera, or using a depth camera to track the object or using hand tracking information. The client module 124 takes the motion of the box 900 and applies the physics and behavior from the contextual application in order to generate the augmented reality display (e.g. virtual objects) that is placed on the back of the box 900. In this example, the detected movement of the box 900 is used to control a first character 906A traversing the maze. As the user moves the cereal box 900 with their hands (902A and 902B), the client module 124 moves the game character 906A according to the character behavior programmed within the contextual application linked to the movement of the box 900. The exact movement of the box 900 with respect to all 6 degrees of freedom is used to move the first character 906A along the path in the game (and subsequently a second character 906B). Special movements of the box 900, such as jerking the box 900 to the right, can be used to cause specific actions for the character 906A such as starting movement of the character; also jerking the box 900 vertically can cause the character 906A to jump as it traverses the maze 904. In accordance with an embodiment, dynamic instructions for the application can be displayed along with the display of the application. For example, on the box shown in FIG. 9, two dynamic animations 908A and 908B teach the user 102 how to move the box 900 in order to have a first character 906A move (shown in 908A) and jump (shown in 908B). In accordance with an embodiment, the contextual application can be programmed such that it changes over time according to the application triggers. The application triggers can include the date, such that the game mechanics (e.g., the path of the maze, the type of maze, or the character skins/animations) changes each day; also, the type of game can change as well (e.g., from a maze game to a puzzle game).

In accordance with an embodiment, there is provided a method for creating and using a deformable mesh controller that can be applied to an object of a specific type or shape (e.g., a cereal box, a soup can, a milk carton, a postcard, a business card, and more) in the environment surrounding the user. A deformable mesh controller is applied by the MR contextual app module 124 onto an object that has been detected (e.g., as a trigger) within the environment surrounding the user. The deformable mesh controller can have behaviors that are initiated and modified (e.g., controlled) by the movement and state of the object on which the deformable mesh controller is applied. The deformable mesh controller can be modified dynamically (e.g., while the MR contextual app module 124 is running) such that the size and shape of the deformable mesh controller is modified by the client module 124 and morphed to the exact size and shape of the object on which the deformable mesh controller is applied. The morphing (e.g., deforming) of the deformable mesh controller to the exact size and shape of the object is done using data that describes the object which comes from data that includes the sensor data from the HMD 220. An MR contextual application that is triggered by the object can use the deformable mesh controller applied to the object as a platform on which to display digital objects. For example, a deformable mesh controller (e.g., created by a video game developer) with generic controls for a cereal box game could be applied to any cereal box regardless of size and brand.

Similarly, a deformable mesh controller made for a cylindrical object such as a soup can could also be applied to a soft drink can.

In accordance with an embodiment, data that defines a deformable mesh controller is included in the app data 304. Process 320 from method 300 can include detecting at least one object which can serve as the controlling object on which the deformable mesh controller is applied by the module 124. Process 330 from method 300 can include downloading (e.g., over the network 150) deformable mesh controller data from a database 140. Process 340 from method 300 can include having the module 124 morph (e.g., deform) the deformable mesh controller to the exact size and shape of the controlling object. Process 350 from method 300 includes the module 124 monitoring the movement and orientation of the controlling object through time and moving the deformable mesh controller with it (e.g., attaching the deformable mesh controller to the object). Process 350 also includes monitoring the interaction of the user with the controlling object. In process 360 of method 300, the module 124 adjusts the execution of a triggered application based on the interactions.

Figure 10A:
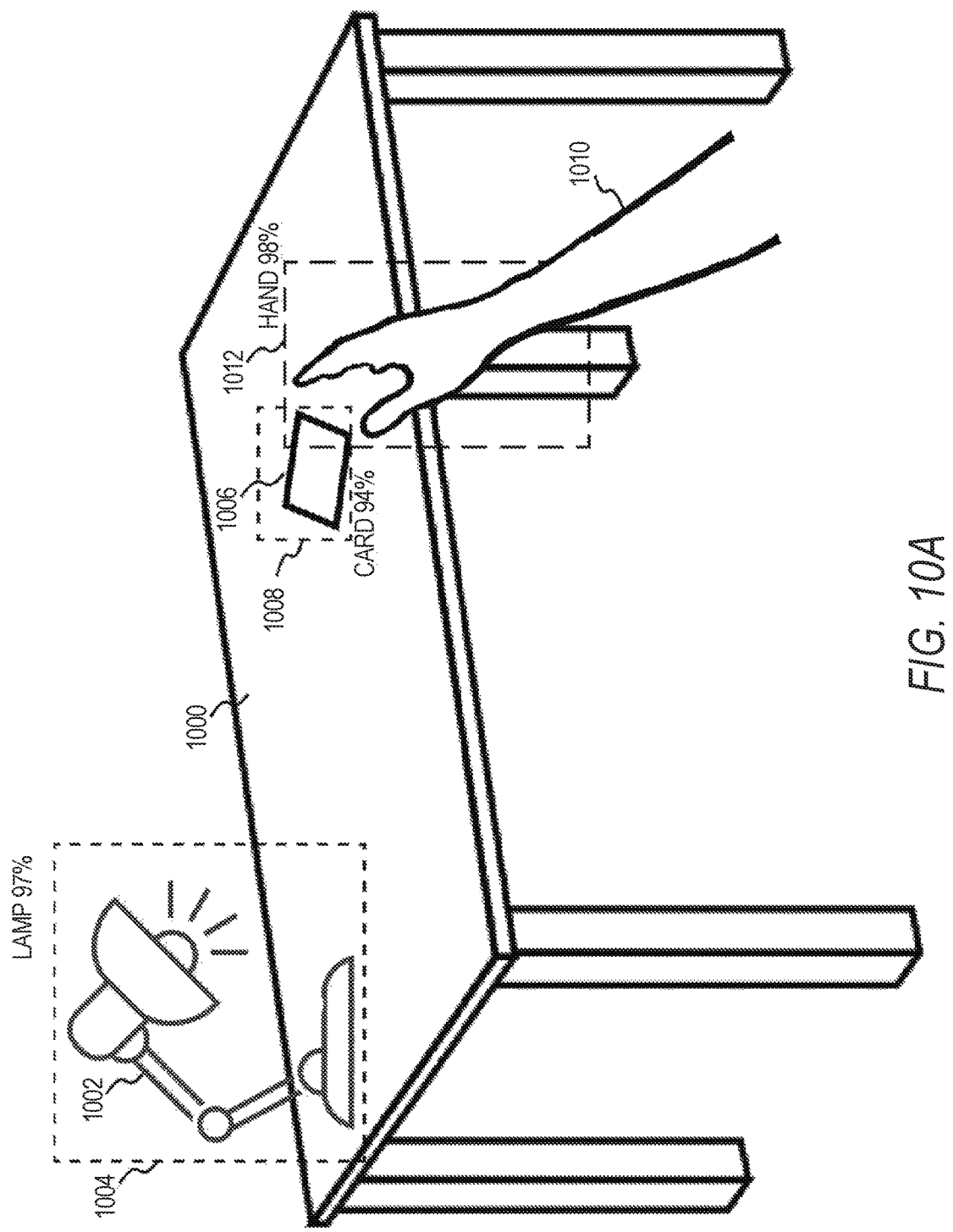
FIGS. 10A, 10B, 10C and 10D illustrate an example MR environment as presented to the user by the MR system via the user device, showing a contextual application controlled by a business card, in accordance with an embodiment.
Figure 10B:
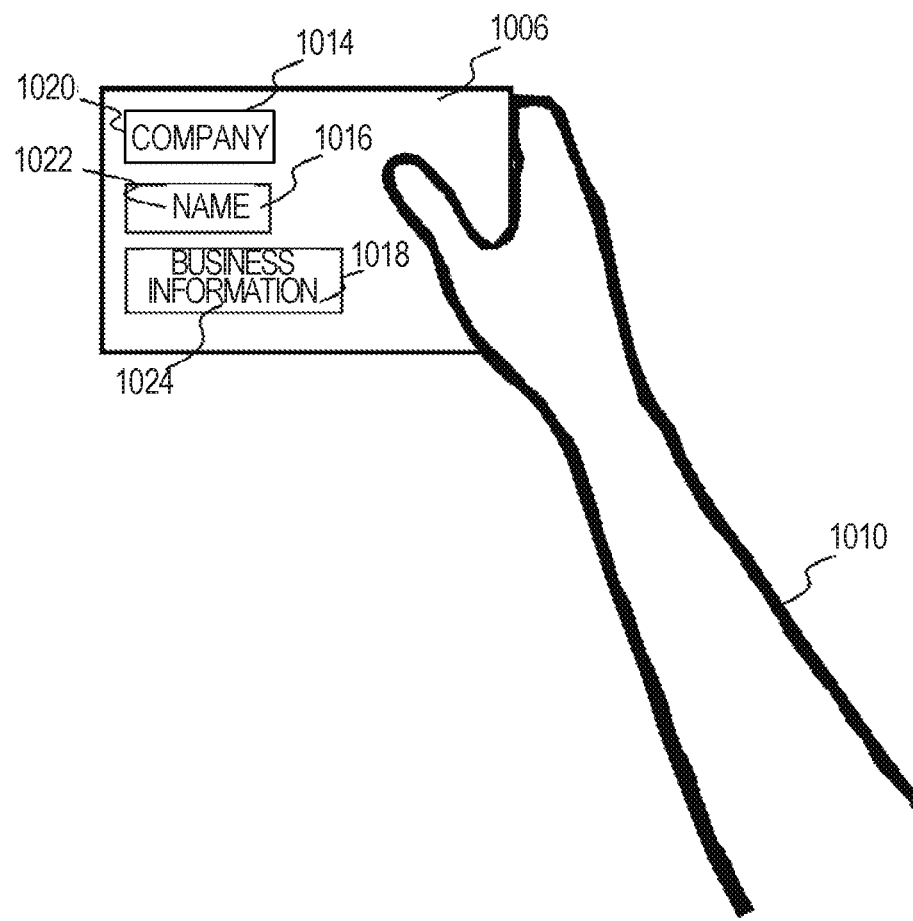
Figure 10C:
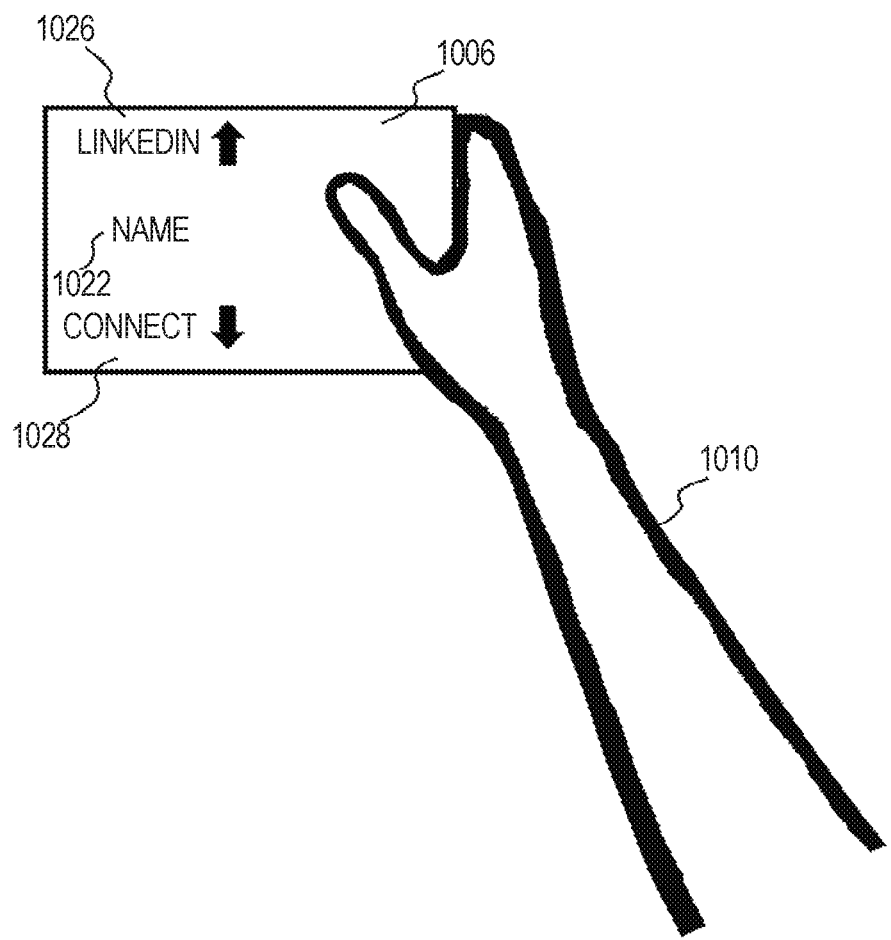
Figure 10D:
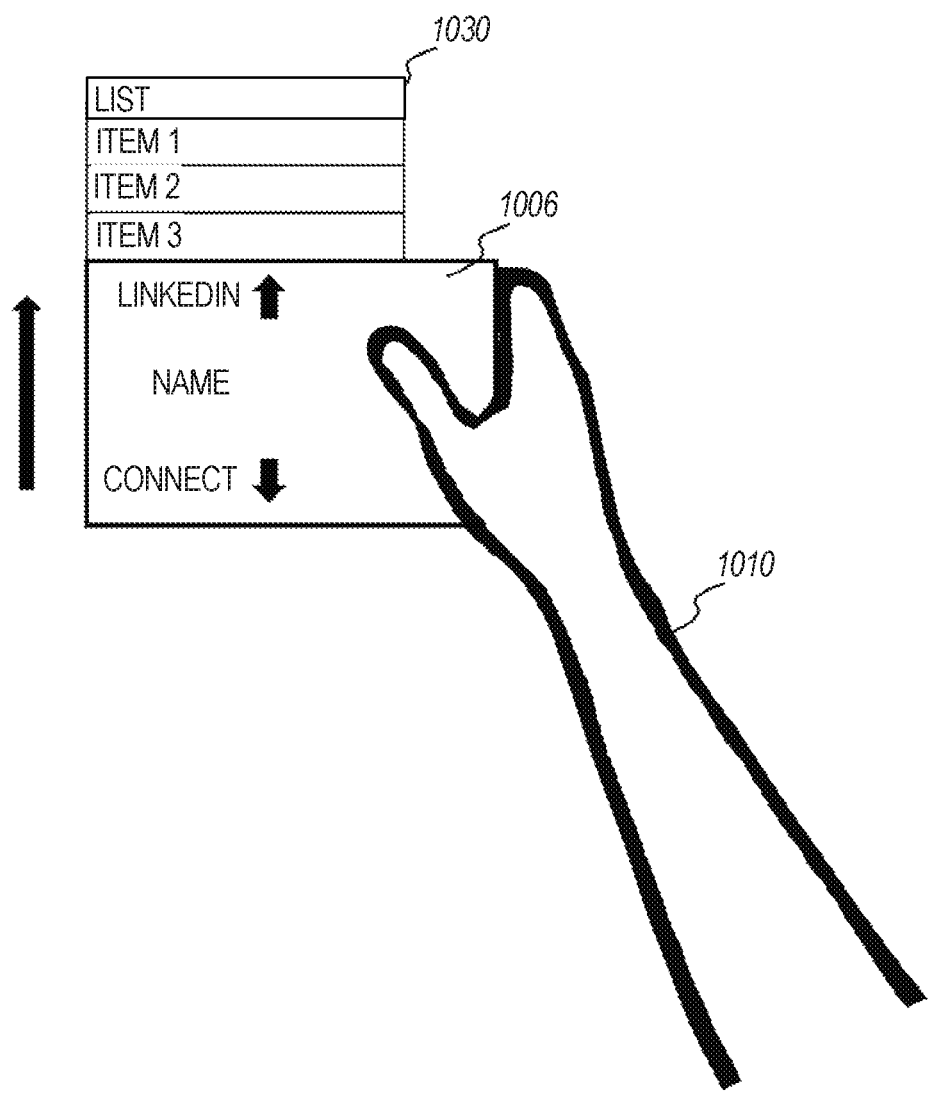

In accordance with an embodiment and shown in FIGS. 10A, 10B, 10C and 10D is an example showing a specific physical object used as a controller of a contextual application for mixed reality. In the example, the contextual application is triggered by, and controlled by, a business card 1006 that is manipulated by a first person. In this example, the business card belongs to a second person and is a specific application trigger which triggers the server MR contextual app module 134 to send a specific application (e.g. related to the card and the second person) to the client MR contextual app module 124 for execution. In this example, the specific application is a mixed reality version of the LinkedIn™ application which has access to the LinkedIn™ data for the second person. The card is used (via an interaction with the first person) as a controller for the application. Specific interactions with the card, which includes moving the card in specific directions and in specific ways as well as tapping the card and swiping on the card and gazing on the card is used to control the application. Some of the interactions can be determined with eye tracking technology and hand tracking technology. For example, the interactions are used to initiate scrolling, selection, opening and closing controls within the application (e.g., for menus and features). For example, as seen in FIGS. 10A to 10D, the first person initiates the LinkedIn™ application by picking up the card. FIGS. 10A to 10D are shown from the perspective of the first person; for example, wearing and looking through a mixed reality HMD 220. As seen in FIG. 10A, the first person is standing in front of, and looking at a table 1000 with a lamp 1002 and a business card 1006 thereon. The hand 1010 of the first person is reaching for the card 1006. With the MR contextual app running (in the background) on the HMD 220, the client MR contextual app module 124 uses object recognition to detect at least the first person's hand 1010 and the business card 1006 of the second person. The MR contextual app module 124 displays dashed boxes around an object in order to confirm to the user that the object has been recognized. In some embodiments the dashed box might include a descriptive label and a confidence percentage for the recognized object. For example, a dashed box 1012 is displayed around the hand 1010 of the user showing 98% confidence that the recognized object is a hand, a dashed box 1004 is displayed around the lamp 1002 shows 97% confidence that the recognized object is a lamp, and a dashed box 1008 is shown around the card 1006 showing 94% confidence that the recognized object is a card. FIG. 10B shows the hand 1010 of the first person holding the card 1006 close enough to the user HMD 220 such that the MR contextual module 124 can recognize writing and images on the card 1006. As shown in FIG. 10B, the client MR contextual app module 124 uses instance segmentation to determine the company name 1020, username 1022 and contact details 1024 associated with the card 1006, and highlights the segments (e.g., perhaps with colored semi-transparent boxes 1014, 1016 and 1918). The MR contextual app module 124 determines (e.g., in accordance with process 320 described with respect to FIG. 3) the card 1006 and the hand 1010 in proximity to each other (e.g., card 1006 being held by the hand 1010) as a trigger for a business card application. The MR contextual app module 124 would then download and execute data for the business card application (e.g., in accordance with process 330 and 340 in method 300 described in FIG. 3). In accordance with the downloaded business card application, the card 1006 can be pitched (e.g., moved upward or downward with respect to the face of the card) in order to select options or open menus to be displayed in mixed reality using the HMD 220. In accordance with the example embodiment, FIG. 10C shows the card 1006 as seen through the HMD 220 while the business card application is executing. In the example embodiment and shown in FIG. 10C, the business card application executed by the MR contextual app module 124 uses diminished reality to erase (e.g., cover over) the contents on the card (e.g., the company name 1020, username 1022 and contact details 1024) and replace them with a digital display of the username 1022, a LinkedIn™ option link 1026, and a 'Connect' option link 1028 (e.g., which might link to a phone app to call the second person using the contact details 1024) In FIG. 10C the card shows a downward arrow with 'Connect' 1028 and an upward arrow with 'LinkedIn profile' 1026. The MR contextual app module 124 continues to monitor the card 1006 and hand 1010 (e.g., as part of process 350 in method 300 described in FIG. 3) in order to detect new triggers which would initiate responses by the business card application. For example, and as shown in FIG. 10D, pitching the card upward (e.g., in a quick motion) can be recognized as a trigger within the business card application to connect with and display the LinkedIn™ account details 1030 of the second person; wherein the LinkedIn™ account details 1030 are shown to appear as popping out of the top of the card 1006 (e.g., as part of process 360 from method 300 as described with respect to FIG. 3). Other motions as described within the business card application would cause the MR contextual app module 124 to perform other actions. For example, shaking the card up and down quickly can initiate a termination of the business card application causing a removal of all digitally displayed objects and a return to the real-world view of the card 1006. As another example, a downward motion might cause the HMD 220 to initiate a mobile phone call (e.g., if it is appropriately equipped) to the second person using the contact details 1024.

In the examples shown in FIGS. 9 and 10, diminished reality technology is used to visually clean surfaces and remove existing physical items from a user's view. Augmented reality technology is then used to add virtual objects to the user's view on top of the physical objects. For example, in FIG. 9, diminished reality can be used to clear the back of the cereal box in order to allow the dynamic virtual maze game to be displayed on the box.

In some embodiments, the MR system 100 may provide layered contextual applications to users 102. More specifically, the MR system 100 may provide various "reality layers" of contextual applications, where different users 102 may experience the same or different contextual applications in the same physical environment. For example, in some embodiments, a "shared layer" (or "shared public feed"). In some embodiments, the shared layer may include content provided by "sponsors" (e.g., owners, custodians) of real-world locations may create MR contextual applications that are activated within their premise (e.g., the physical boundaries of a store or restaurant, geo-fenced area, within the range of a local Wi-Fi network, or within legal property boundaries). In some embodiments, the shared layer may include user-sponsored content. As such, all users 102 may be allowed to experience contextual applications of various sponsors via the shared layer (e.g., as they visit particular locations, possibly as an opt-out or opt-in reality), and where the sponsors control the content presented.

In some embodiments, the MR system 100 may provide additional layers of contextual applications. For example, the MR system 100 may allow users 102 to create and publish contextual applications within their own "private layer", or within a "user-generated layer" (e.g., containing user-generated content). As such, the user 102 may experience the private layer contextual applications instead of, or in addition to, contextual applications of other layers. In some embodiments, the MR system 100 may allow sponsors to provide tiered layers of contextual applications. For example, a particular sponsor may provide a "public layer" for everyone visiting their location (e.g., as described above), and may also provide an "employee layer" or a "members only layer" that is experienced only by employees or members of the sponsor (e.g., based on subscription to a service, or based on purchased content).

In some embodiments, multiple layers may be experienced simultaneously. For example, the MR system 100 may provide both a shared layer's content and the user's own private layer content to the user at a given location simultaneously. In some embodiments, the MR system 100 may present the user 102 with a selection of layers available to the user 102 at a particular location, or at a particular time.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The modules, methods, applications and so forth described in conjunction with FIGS. 1-10D are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the systems and methods described herein in different contexts from this disclosure.

Figure 11:
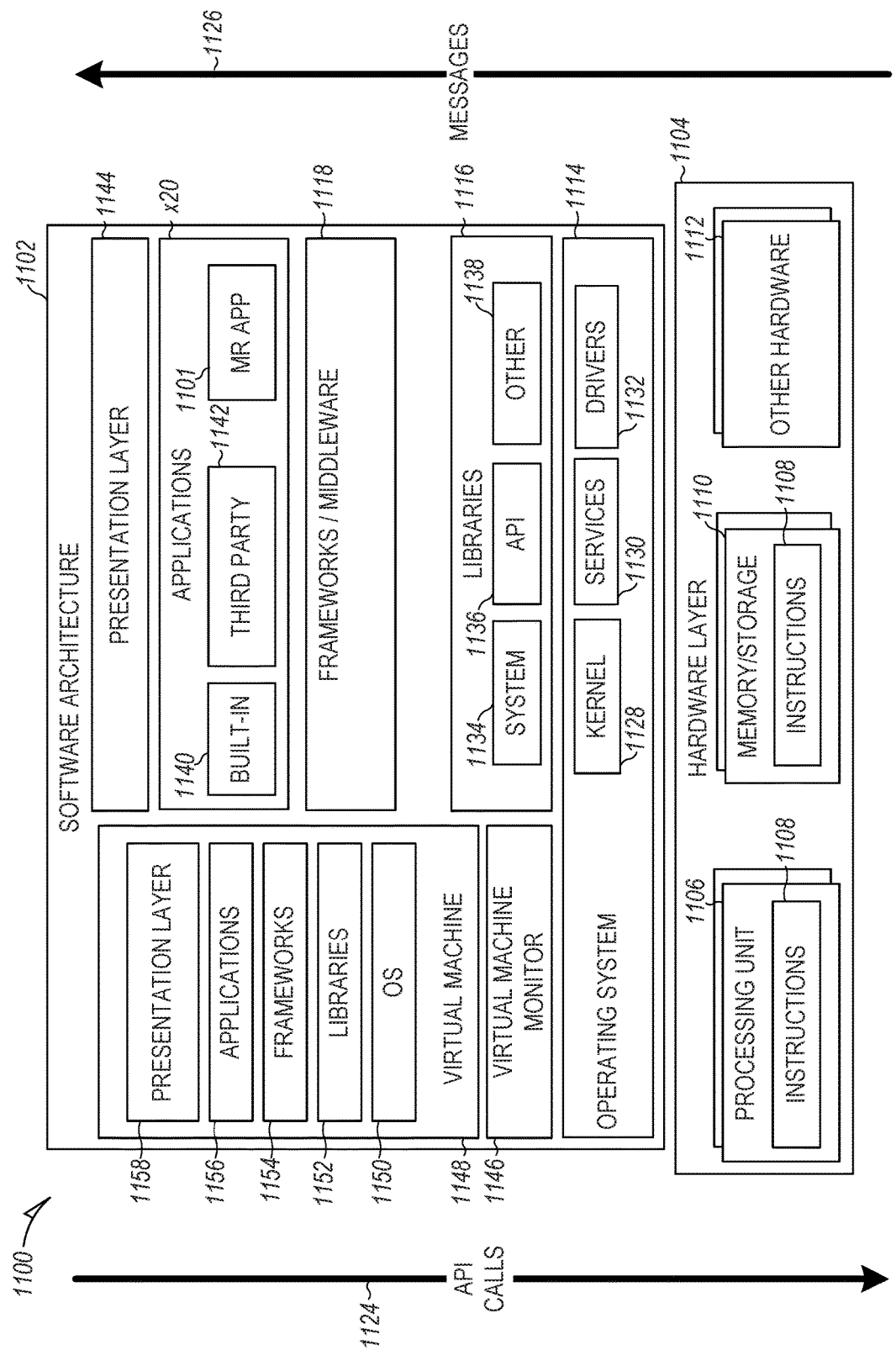
FIG. 11 is a block diagram illustrating a representative software architecture, which may be used in conjunction with various hardware architectures described herein to provide the VR tools and development environment described herein.

FIG. 11 is a block diagram 1100 illustrating a representative software architecture 1102, which may be used in conjunction with various hardware architectures described herein to provide the VR tools and development environment described herein. FIG. 11 is merely a non-limiting example of a software architecture and it will be appreciated that many other architectures may be implemented to facilitate the functionality described herein. The software architecture 1102 may be executing on hardware such as machine 1200 of FIG. 12 that includes, among other things, processors 1210, memory 1230, and I/O components 1250. A representative hardware layer 1104 is illustrated and can represent, for example, the machine 1200 of FIG. 12. The representative hardware layer 1104 comprises one or more processing units 1106 having associated executable instructions 1108. Executable instructions 1108 represent the executable instructions of the software architecture 1102, including implementation of the methods, modules and so forth of FIGS. 1-10D. Hardware layer 1104 also includes memory or storage modules 1110, which also have executable instructions 1108. Hardware layer 904 may also comprise other hardware as indicated by 1112 which represents any other hardware of the hardware layer 1104, such as the other hardware illustrated as part of machine 1200.

In the example architecture of FIG. 11, the software 1102 may be conceptualized as a stack of layers where each layer provides particular functionality. For example, the software 1102 may include layers such as an operating system 1114, libraries 1116, frameworks/middleware 1118, applications 1120 and presentation layer 1122. Operationally, the applications 1120 or other components within the layers may invoke application programming interface (API) calls 1124 through the software stack and receive a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 918, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1116 may provide a common infrastructure that may be utilized by the applications 1120 or other components or layers. The libraries 1116 typically provide functionality that allows other software modules to perform tasks in an easier fashion than to interface directly with the underlying operating system 1114 functionality (e.g., kernel 1128, services 1130 or drivers 1132). The libraries 916 may include system 1134 libraries (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 916 may also include a wide variety of other libraries 1138 to provide many other APIs to the applications 920 and other software components/modules.

The frameworks 1118 (also sometimes referred to as middleware) may provide a higher-level common infrastructure that may be utilized by the applications 1120 or other software components/modules. For example, the frameworks 1118 may provide various graphic user interface (GUI) functions, high-level resource management, high-level location services, and so forth. The frameworks 1118 may provide a broad spectrum of other APIs that may be utilized by the applications 1120 or other software components/modules, some of which may be specific to a particular operating system or platform.

The applications 1120 includes built-in applications 1140 or third-party applications 1142. Examples of representative built-in applications 940 may include, but are not limited to, a contacts application, a browser application, a book reader application, a location application, a media application, a messaging application, a MR application 1101, or a game application. Third party applications 1142 may include any of the built-in applications as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1142 may invoke the API calls 1124 provided by the mobile operating system such as operating system 1114 to facilitate functionality described herein.

The applications 1120 may utilize built in operating system functions (e.g., kernel 1128, services 1130 or drivers 1132), libraries (e.g., system 1134, APIs 1136, and other libraries 1138), frameworks/middleware 1118 to create user interfaces to interact with users of the system. Alternatively, or additionally, in some systems interactions with a user may occur through a presentation layer, such as presentation layer 1144. In these systems, the application/module "logic" can be separated from the aspects of the application/module that interact with a user.

Some software architectures utilize virtual machines. In the example of FIG. 11, this is illustrated by virtual machine 1148. A virtual machine creates a software environment where applications/modules can execute as if they were executing on a hardware machine (such as the machine of FIG. 12, for example). A virtual machine is hosted by a host operating system (operating system 1114 in FIG. 11) and typically, although not always, has a virtual machine monitor 1146, which manages the operation of the virtual machine as well as the interface with the host operating system (i.e., operating system 1114). A software architecture executes within the virtual machine such as an operating system 1150, libraries 1152, frameworks/middleware 1154, applications 1156 or presentation layer 1158. These layers of software architecture executing within the virtual machine 1148 can be the same as corresponding layers previously described or may be different.

In the example embodiment, the MR application 1101 operates as an application in the applications 1120 layer. However, in some embodiments, the MR application 1101 may operate in other software layers, or in multiple software layers (e.g., framework 1118 and application 1120), or in any architecture that enables the systems and methods as described herein.

Figure 12:
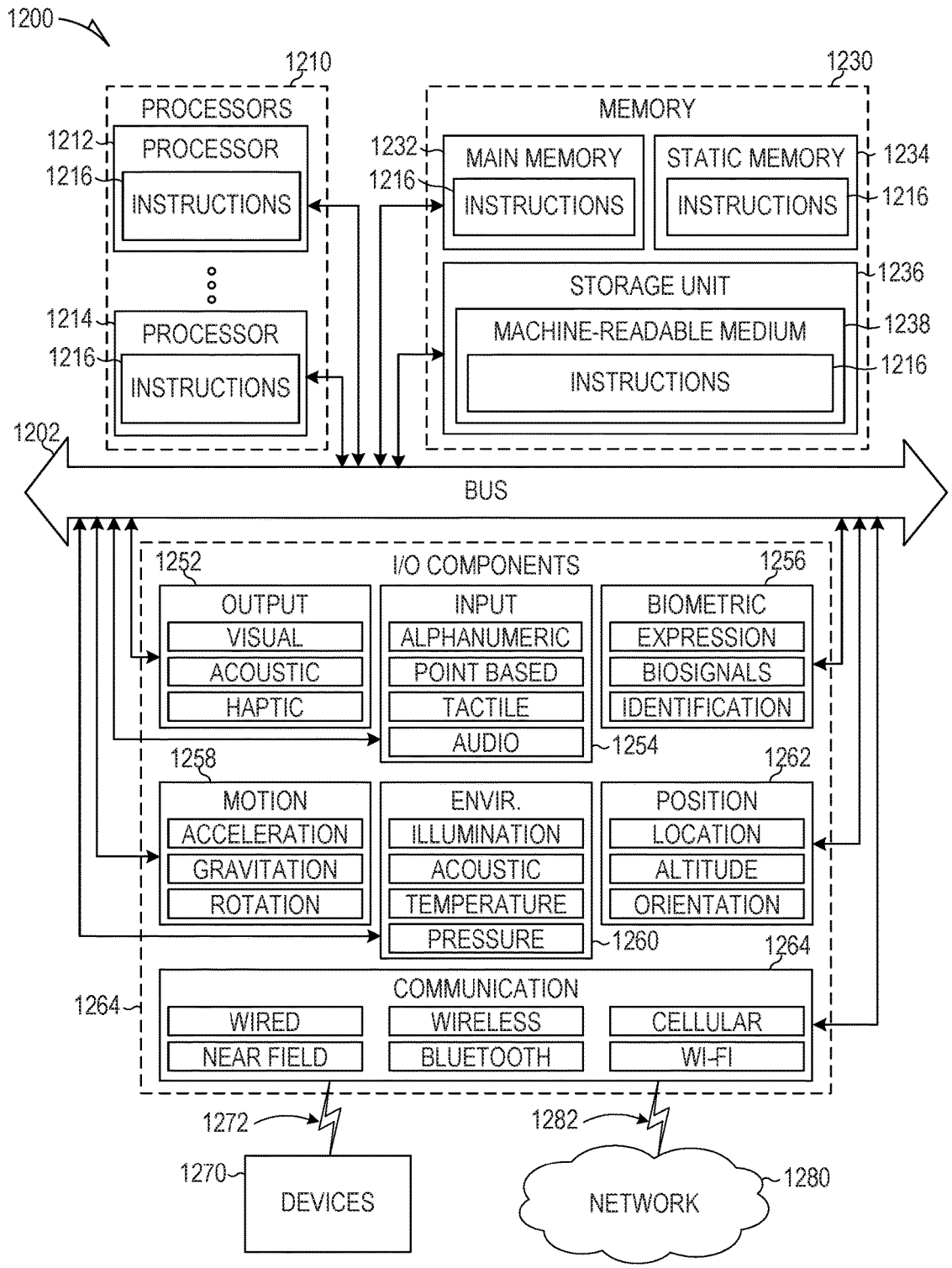
FIG. 12 is a block diagram illustrating components of a machine, according to some example embodiments, able to read instructions from a machine-readable medium (e.g., a machine-readable storage medium) and perform any one or more of the VR methodologies discussed herein.

FIG. 12 is a block diagram illustrating components of a machine 1000, according to some example embodiments, able to read instructions from a machine-readable medium 1238 (e.g., a machine-readable storage medium) and perform any one or more of the VR methodologies discussed herein. Specifically, FIG. 12 shows a diagrammatic representation of the machine 1200 in the example form of a computer system, within which instructions 1216 (e.g., software, a software module, a program, an application, an applet, an app, or other executable code) for causing the machine 1200 to perform any one or more of the methodologies or operations discussed herein may be executed. For example, the instructions may cause the machine to execute the one or more of the operations discussed with respect to FIG. 3. The instructions transform the general, non-programmed machine into a particular machine programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other such as via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1212 and processor 1214 that may execute instructions 1216. The term "processor" is intended to include multi-core processor that may comprise two or more independent processors (sometimes referred to as "cores") that may execute instructions contemporaneously. Although FIG. 12 shows multiple processors, the machine 1200 may include a single processor with a single core, a single processor with multiple cores (e.g., a multi-core process), multiple processors with a single core, multiple processors with multiples cores, or any combination thereof.

The memory/storage 1230 may include a memory 1232, such as a main memory, or other memory storage, and a storage unit 1236, both accessible to the processors 1210 such as via the bus 1202. The storage unit 1236 and memory 1232 store the instructions 1216 embodying any one or more of the methodologies or functions described herein. The instructions 1216 may also reside, completely or partially, within the memory 1232, within the storage unit 1236, within at least one of the processors 1210 (e.g., within the processor's cache memory), or any suitable combination thereof, during execution thereof by the machine 1200. Accordingly, the memory 1232, the storage unit 1236, and the memory of processors 1210 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes transitory signals per se.

The I/O components 1250 may include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion and the grouping is in no way limiting. In various example embodiments, the I/O components 1250 may include output components 1252 and input components 1254. The output components 1252 may include visual components (e.g., displays such as a plasma display panel (PDP), a light emitting diode (LED) display, a liquid crystal display (LCD), a projector, a cathode ray tube (CRT), or wearable devices such as head-mounted display (HMD) devices), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), motion-sensing input components (e.g., hand controllers), audio input components (e.g., a microphone), and the like.

In further example embodiments, the I/O components 1250 may include biometric components 1256, motion components 1258, environmental components 1260, or position components 1262 among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1258 may include acceleration sensor components (e.g., accelerometer), gravitation sensor components, rotation sensor components (e.g., gyroscope), position-sensing components, and so forth. The environmental components 1260 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1262 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via coupling 1282 and coupling 1272 respectively. For example, the communication components 1264 may include a network interface component or other suitable device to interface with the network 1280. In further examples, communication components 1264 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a Universal Serial Bus (USB)).

In various example embodiments, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network and the coupling 1282 may be a Code Division Multiple Access (CDMA) connection, a Global System for Mobile communications (GSM) connection, or other type of cellular or wireless coupling. In this example, the coupling 1282 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1216 may be transmitted or received over the network 1280 using a transmission medium via a network interface device (e.g., a network interface component included in the communication components 1264) and utilizing any one of a number of transfer protocols (e.g., hypertext transfer protocol (HTTP)). Similarly, the instructions 1216 may be transmitted or received using a transmission medium via the coupling 1272 (e.g., a peer-to-peer coupling) to devices 1270. The term "transmission medium" shall be taken to include any intangible medium that is capable of storing, encoding, or carrying instructions 1216 for execution by the machine 1200, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   one or more computer processors;
   one or more computer memories; and
   a set of instructions incorporated into the one or more computer memories, the set of instructions configuring the one or more computer processors to perform operations for implementing a plurality of contextual applications within a mixed reality (MR) environment on an MR-capable device of a user, the operations comprising:
   identifying at least one real-world object in the MR environment by applying an object recognition algorithm to one or more attributes of the at least one real-world object that are captured by sensors of the MR-capable device;
   using a first contextual application of the plurality of contextual applications to determine an association between a first set of contextual triggers and a second contextual application of the plurality of contextual applications, the first contextual application being a launcher application;
   initiating the second contextual application based on a determination that at least one of the first set of contextual triggers has been satisfied, the determination that the at least one of the first set of contextual triggers has been satisfied being based on an analysis of real-time data corresponding to surroundings captured by the sensors of the MR-capable device, the initiating including presenting at least one virtual object that is associated with the second contextual application in the mixed reality environment; and
   invoking a function within the second contextual application based on a determination that an interaction of the user with the at least one virtual object satisfies a second set of contextual triggers, the second set of contextual triggers being associated with the second contextual application, the determination that the interaction of the user with the at least one virtual object satisfies the second set of contextual triggers being based on interaction rules defined by the second contextual application.

2. The system of claim 1, wherein the applying of the object recognition algorithm includes using artificial intelligence to perform the identifying of the at least one real-world object in the MR environment.

3. The system of claim 1, wherein the presenting of the at least one virtual object by the second contextual application is based on a correspondence between the user and a shared display layer associated with the second contextual application running on a second MR-capable device.

4. The system of claim 1, wherein the interaction of the user includes using the at least one real-world object as a controller.

5. The system of claim wherein the initiating of the second contextual application includes applying diminished reality technology to modify a depiction of the at least one real-world object on the MR-capable device.

6. The system of claim 4, wherein the using of the at least one real-world object as a controller includes manipulating the real-world object in three dimensions to control an action within the second contextual application, the action defined using an application program interface of the second contextual application.

7. The system of 1, wherein the first set of contextual triggers includes a combination of elements including at least two of data pertaining to a time of the identifying, data pertaining to a location of the MR device, and data pertaining to a set of additional real-world objects identified in the MR environment.

8. A method comprising:
   incorporating a set of instructions into one or more computer memories, the set of instructions configuring one or more computer processors to perform operations for implementing a plurality of contextual applications within a mixed reality (MR) environment on an MR-capable device of a user, the operations comprising:

identifying at least one real-world object in the MR environment by applying an object recognition algorithm to one or more attributes of the at least one real-world object that are captured by sensors of the MR-capable device;

using a first contextual application of the plurality of contextual applications to determine an association between a first set of contextual triggers and a second contextual application of the plurality of contextual applications, the first contextual application being a launcher application;

initiating the second contextual application based on a determination that at least one of the first set of contextual triggers has been satisfied, the determination that the at least one of the first set of contextual triggers has been satisfied being based on an analysis of real-time data corresponding to surroundings captured by the sensors of the MR-capable device, the initiating including presenting at least one virtual object that is associated with the second contextual application in the mixed reality environment; and invoking a function within the second contextual application based on a determination that an interaction of the user with the at least one virtual object satisfies a second set of contextual triggers, the second set of contextual triggers being associated with the second contextual application, the determination that the interaction of the user with the at least one virtual object satisfies the second set of contextual triggers being based on interaction rules defined by the second contextual application.

9. The method of claim 8, wherein the applying of the object recognition algorithm includes using artificial intelligence to perform the identifying of the at least one real-world object in the MR environment.

10. The method of claim 8, wherein the presenting of the at least one virtual object by the second contextual application is based on a correspondence between the user and a shared display layer associated with the second contextual application running on a second MR-capable device.

11. The method of claim 8, wherein the interaction of the user includes using the at least one real-world object as a controller.

12. The method of claim 8, wherein the initiating of the second contextual application includes applying diminished reality technology to modify a depiction of the at least one real-world object on the MR-capable device.

13. The method of claim 11, wherein the using of the at least one real-world object as a controller includes manipulating the real-world object in three dimensions to control an action within the second contextual application, the action defined using an application program interface of the second contextual application.

14. The method of 8, wherein the first set of contextual triggers includes a combination of elements including at least two of data pertaining to a time of the identifying, data pertaining to a location of the MR device, and data pertaining to a set of additional real-world objects identified in the MR environment.

15. A non-transitory machine-readable medium embodying a set of instructions, the set of instructions configuring one or more computer processors to perform operations for implementing a plurality of contextual applications within a mixed reality (MR) environment on an MR-capable device of a user, the operations comprising:

identifying at least one real-world object in the MR environment by applying an object recognition algorithm to one or more attributes of the at least one real--world object that are captured by sensors of the MR-capable device;

using a first contextual application of the plurality of contextual applications to determine an association between a first set of contextual triggers and a second contextual application of the plurality of contextual applications, the first contextual application being a launcher application;

initiating the second contextual application based on a determination that at least one of the first set of contextual triggers has been satisfied, the determination that the at least one of the first set of contextual triggers has been satisfied being based on an analysis of real-time data corresponding to surroundings captured by the sensors of the MR-capable device, the initiating including presenting at least one virtual object that is associated with the second contextual application in the mixed reality environment; and invoking a function within the second contextual application based on a determination that an interaction of the user with the at least one virtual object satisfies a second set of contextual triggers, the second set of contextual triggers being associated with the second contextual application, the determination that the interaction of the user with the at least one virtual object satisfies the second set of contextual triggers being based on interaction rules defined by the second contextual application.

16. The non-transitory machine-readable medium of claim 15, wherein the applying of the object recognition algorithm includes using artificial intelligence to perform the identifying of the at least one real-world object in the MR environment.

17. The non-transitory machine-readable medium of claim 15, wherein the presenting of the at least one virtual object by the second contextual application is based on a correspondence between the user and a shared display layer associated with the second contextual application running on a second MR-capable device.

18. The non-transitory machine-readable medium of claim 15, wherein the interaction of the user includes using the at least one real-world object as a controller.

19. The non-transitory machine-readable medium of claim 15, wherein the initiating of the second contextual application includes applying diminished reality technology to modify a depiction of the at least one real-world object on the MR-capable device.

20. The non-transitory machine-readable medium of claim 18, wherein the using of the at least one real-world object as a controller includes manipulating the real-world object in three dimensions to control an action within the second contextual application, the action defined using an application program interface of the second contextual application.

* * * * *

UNITED STATES PATENT AND TRADEMARK OFFICE
CERTIFICATE OF CORRECTION

PATENT NO. : 10,360,734 B2
APPLICATION NO. : 15/972020
DATED : July 23, 2019
INVENTOR(S) : Drouin et al.

It is certified that error appears in the above-identified patent and that said Letters Patent is hereby corrected as shown below:

In the Claims

In Column 26, Line 47, in Claim 5, delete "claim" and insert --claim 1,-- therefor In Column 26, Line 57, in Claim 7, delete "1," and insert --claim 1,-- therefor In Column 27, Line 56, in Claim 14, delete "8," and insert --claim 8,-- therefor In Column 28, Line 7, in Claim 15, delete "real--world" and insert --real-world-- therefor Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*